United States Patent
Yoneda et al.

(10) Patent No.: US 9,843,073 B2
(45) Date of Patent: Dec. 12, 2017

(54) SECONDARY BATTERY

(71) Applicant: Semiconductor Energy Laboratory Co., Ltd., Atsugi-shi, Kanagawa-ken (JP)

(72) Inventors: Yumiko Yoneda, Kanagawa (JP); Masaki Yamakaji, Kanagawa (JP); Ryota Tajima, Kanagawa (JP); Masaaki Hiroki, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 71 days.

(21) Appl. No.: 14/854,349

(22) Filed: Sep. 15, 2015

(65) Prior Publication Data

US 2016/0087305 A1 Mar. 24, 2016

(30) Foreign Application Priority Data

Sep. 19, 2014 (JP) .................. 2014-190900

(51) Int. Cl.
| | |
|---|---|
| *H01M 10/0565* | (2010.01) |
| *H01M 2/02* | (2006.01) |
| *H01M 4/02* | (2006.01) |
| *H01M 4/13* | (2010.01) |
| *H01M 10/04* | (2006.01) |

(Continued)

(52) U.S. Cl.
CPC ......... *H01M 10/0565* (2013.01); *H01M 4/02* (2013.01); *H01M 4/13* (2013.01); *H01M 10/0436* (2013.01); *H01M 10/052* (2013.01); *H01M 10/0585* (2013.01); *H01M 2/0275* (2013.01); *H01M 2300/0085* (2013.01); *Y02T 10/7011* (2013.01)

(58) Field of Classification Search
None
See application file for complete search history.

(56) References Cited

U.S. PATENT DOCUMENTS

| | | |
|---|---|---|
| 7,332,242 B2 | 2/2008 | Sato et al. |
| 7,764,046 B2 | 7/2010 | Osada |

(Continued)

FOREIGN PATENT DOCUMENTS

| | | |
|---|---|---|
| CN | 001343023 A | 4/2002 |
| CN | 102656729 A | 9/2012 |

(Continued)

OTHER PUBLICATIONS

International Search Report (Application No. PCT/IB2015/056853) dated Nov. 24, 2015.

(Continued)

*Primary Examiner* — Basia Ridley
*Assistant Examiner* — Christopher Domone
(74) *Attorney, Agent, or Firm* — Fish & Richardson P.C.

(57) ABSTRACT

A gel electrolyte and a separator are provided between the positive electrode current collector and the negative electrode current collector. The plurality of positive electrode current collectors and the plurality of negative electrode current collectors are stacked such that surfaces of negative electrodes with which active material layers are not coated or surfaces of positive electrodes with which active material layers are not coated are in contact with each other.

20 Claims, 17 Drawing Sheets

(51) Int. Cl.
*H01M 10/052* (2010.01)
*H01M 10/0585* (2010.01)

(56) References Cited

U.S. PATENT DOCUMENTS

| | | | |
|---|---|---|---|
| 7,944,172 B2 | 5/2011 | Osada | |
| 8,785,030 B2 | 7/2014 | Ueda | |
| 8,847,556 B2 | 9/2014 | Osada | |
| 2002/0034685 A1 | 3/2002 | Sato et al. | |
| 2003/0082458 A1* | 5/2003 | Oyama | C08F 290/062 429/303 |
| 2010/0081057 A1 | 4/2010 | Liu et al. | |
| 2010/0178543 A1 | 7/2010 | Gruner et al. | |
| 2010/0301279 A1 | 12/2010 | Nesper et al. | |
| 2010/0303706 A1 | 12/2010 | Wallace et al. | |
| 2011/0121240 A1 | 5/2011 | Amine et al. | |
| 2011/0227000 A1 | 9/2011 | Ruoff et al. | |
| 2012/0058378 A1* | 3/2012 | Lee | B32B 27/08 429/127 |
| 2012/0202101 A1 | 8/2012 | Ueda | |
| 2012/0276434 A1 | 11/2012 | Gaikwad et al. | |
| 2013/0252065 A1 | 9/2013 | Ueda | |
| 2014/0272538 A1 | 9/2014 | Mitchell et al. | |
| 2014/0295229 A1* | 10/2014 | Janik | H01M 2/0421 429/89 |
| 2016/0133916 A1* | 5/2016 | Zagars | H01M 4/02 429/152 |

FOREIGN PATENT DOCUMENTS

| | | |
|---|---|---|
| EP | 1195822 A | 4/2002 |
| EP | 2631962 A | 8/2013 |
| JP | 2002-151159 A | 5/2002 |
| JP | 2002-359006 A | 12/2002 |
| JP | 2012-117010 A | 6/2012 |
| JP | 2013-211262 A | 10/2013 |
| JP | 2013-251048 A | 12/2013 |
| JP | 5426771 | 2/2014 |
| JP | 5555380 | 7/2014 |
| KR | 2002-0018961 A | 3/2002 |
| TW | 515123 | 12/2002 |
| WO | WO-2012/001885 | 1/2012 |
| WO | WO-2013/031148 | 3/2013 |
| WO | WO-2014/159976 | 10/2014 |

OTHER PUBLICATIONS

Written Opinion (Application No. PCT/IB2015/056853) dated Nov. 24, 2015.

* cited by examiner

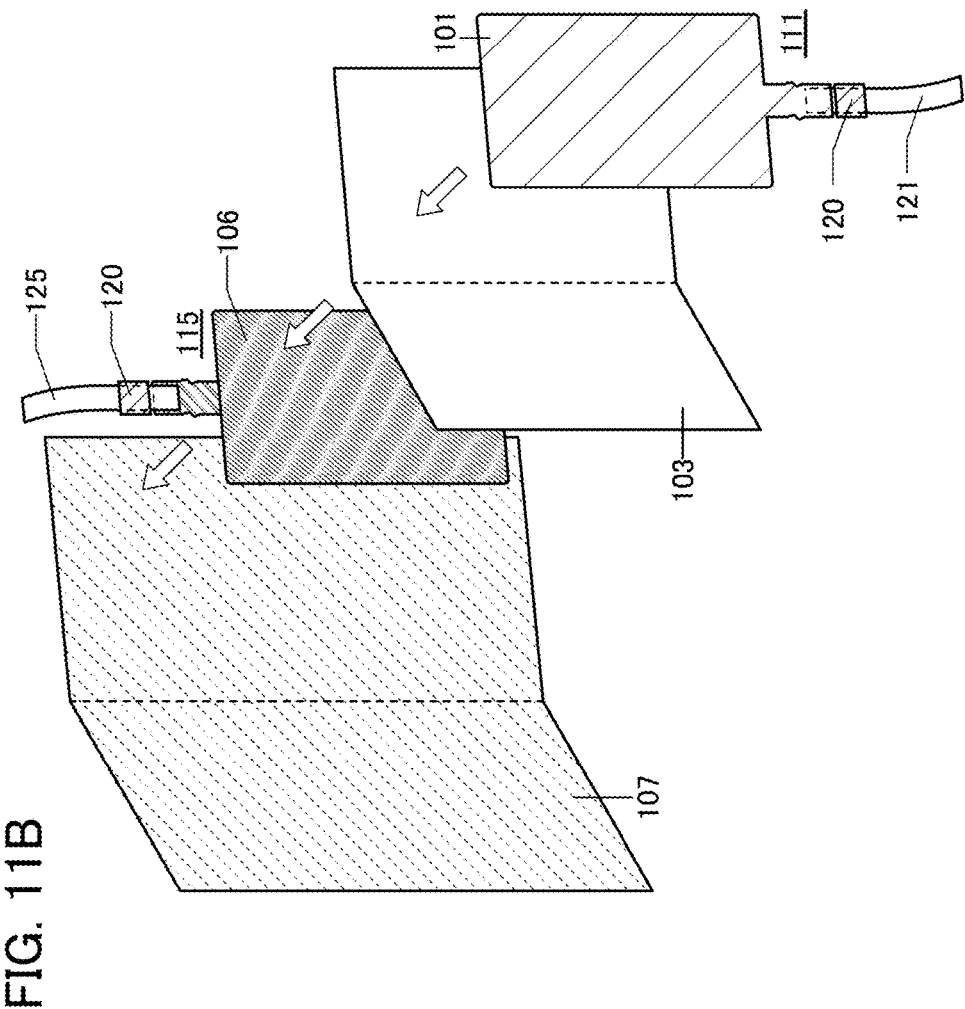
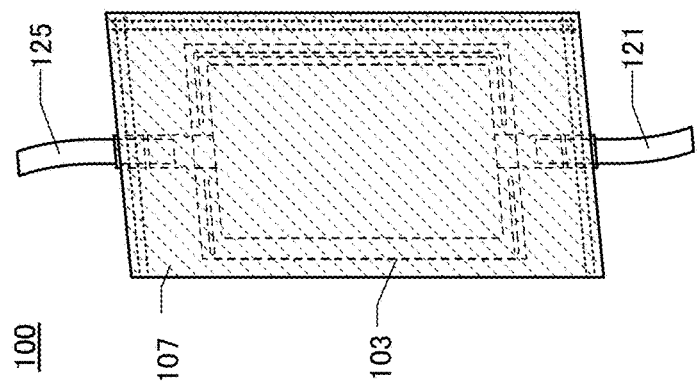
FIG. 11A
FIG. 11B

SECONDARY BATTERY

TECHNICAL FIELD

One embodiment of the present invention relates to an object, a method, or a manufacturing method. The present invention relates to a process, a machine, manufacture, or a composition of matter. One embodiment of the present invention relates to a semiconductor device, a display device, a light-emitting device, a power storage device, a lighting device, an electronic device, or a manufacturing method thereof. Specifically, one embodiment of the present invention relates to a secondary battery and an electronic device.

Note that electronic devices in this specification generally mean devices including secondary batteries, and electro-optical devices including secondary batteries, information terminal devices including secondary batteries, and the like are all electronic devices.

BACKGROUND ART

In recent years, wearable devices have been under active development. Since a feature of wearable devices is that they are carried on one's body, many of them can conform to a curved surface of the body or be curved according to the movement of the body. Therefore, flexible secondary batteries for wearable devices have been also under development, like those for displays or other housings.

For example, Patent Document 1 discloses a sheet-like power storage device which can be curved or bent in at least one axis direction, and electronic devices including the power storage device.

REFERENCE

Patent Document

[Patent Document 1] Japanese Published Patent Application No. 2013-211262

DISCLOSURE OF INVENTION

In many secondary batteries, a plurality of positive electrode current collectors and a plurality of negative electrode current collectors are stacked in order to increase the capacity.

However, when a secondary battery including a plurality of positive electrode current collectors and a plurality of negative electrode current collectors is curved, the capacity and cycle characteristics of the secondary battery have tended to be degraded.

As a result of the investigation of the cause of the degradation in the capacity and cycle characteristics, the present inventors have found that highly curved portions and slightly curved portions are generated locally in current collectors when a secondary battery including a plurality of positive electrode current collectors and a plurality of negative electrode current collectors is curved. FIG. 14 is a schematic cross-sectional view of a curved secondary battery. A highly curved portion 301 and a slightly curved portion 302 are generated in parts of a negative electrode current collector 105 and in parts of a positive electrode current collector 101. Because the positions of highly curved portions vary among the current collectors, variation in a distance 311 between the positive electrode current collector 101 and the negative electrode current collector 105 is caused. The present inventors have found that the variation in the distance causes variation in battery reaction rate between surfaces of the current collectors, which leads to reduction in the capacity of the secondary battery and degradation of the secondary battery.

In view of the above, in one embodiment of the present invention, a secondary battery having a novel structure is provided. Specifically, a flexible secondary battery having a novel structure is provided.

An object of one embodiment of the present invention is to provide a novel power storage device, a novel electronic device, or the like. Note that the descriptions of these objects do not disturb the existence of other objects. In one embodiment of the present invention, there is no need to achieve all the objects. Other objects will be apparent from and can be derived from the description of the specification, the drawings, the claims, and the like.

To achieve the above objects, in one embodiment of the present invention, a polymer including an electrolyte and a separator are provided between a positive electrode current collector and a negative electrode current collector. Since a polymer can be gelled, a distance between a positive electrode current collector and a negative electrode current collector can be kept constant more easily.

Furthermore, a plurality of positive electrode current collectors and a plurality of negative electrode current collectors are stacked such that surfaces with which negative electrode active material layers are not coated are in contact with each other or surfaces with which positive electrode active material layers are not coated are in contact with each other. Such a contact surface has lower friction than a contact surface between the separator and the positive electrode active material layer and a contact surface between the separator and the negative electrode active material layer. This contact surface having low friction slides, in which case stress caused by the difference between the inner diameter and outer diameter of a curved portion, which is generated when the secondary battery is curved, can be easily relieved. Such a structure can suppress local generation of highly curved portions and slightly curved portions in current collectors, and suppress variation in the distance between the positive electrode current collector and the negative electrode current collector.

A secondary battery having a novel structure can be provided. Specifically, a flexible secondary battery having a novel structure can be provided.

Furthermore, a novel power storage device, a novel electronic device, or the like can be provided. Note that the description of these effects does not disturb the existence of other effects. One embodiment of the present invention does not necessarily achieve all the objects listed above. Other effects will be apparent from and can be derived from the description of the specification, the drawings, the claims, and the like.

BRIEF DESCRIPTION OF DRAWINGS

FIG. 11A illustrates an example of a secondary battery, and FIG. 11B illustrates an example of manufacturing method of the secondary battery.

BEST MODE FOR CARRYING OUT THE INVENTION

Figure 1A:
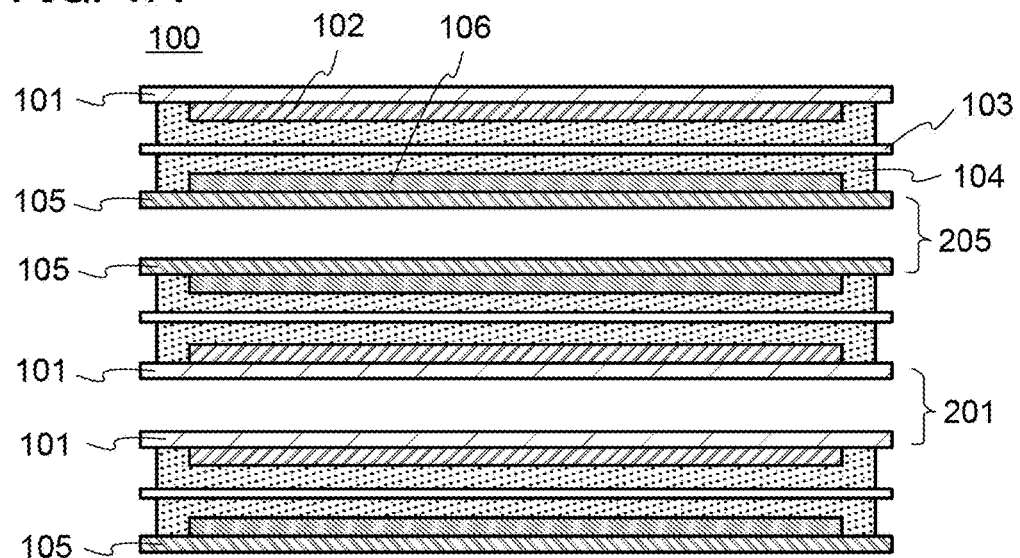
FIGS. 1A to 1D illustrate a structure example of a secondary battery.

Embodiments of the present invention will be described below in detail with reference to the drawings. However, the present invention is not limited to the description below, and it is easily understood by those skilled in the art that modes and details disclosed herein can be modified in various ways. Further, the present invention is not construed as being limited to description of the embodiments and the examples.

The term "electrically connected" includes the case where components are connected through an "object having any electric function". There is no particular limitation on the "object having any electric function" as long as electric signals can be transmitted and received between the components connected through the object.

The position, size, range, or the like of each component illustrated in drawings and the like is not accurately represented in some cases for easy understanding. Therefore, the disclosed invention is not necessarily limited to the position, the size, the range, or the like disclosed in the drawings and the like.

The ordinal number such as "first", "second", and "third" are used to avoid confusion among components.

Embodiment 1

In this embodiment, a structure example of a secondary battery of one embodiment of the present invention is described with reference to FIGS. 1A to 1D and FIGS. 3A and 3B.

[1. Typical Structure]

A secondary battery 100 illustrated in FIG. 1A includes a positive electrode current collector 101, a negative electrode current collector 105, and a separator 103. The positive electrode current collector 101 has the positive electrode active material layer 102 on one surface, and does not have a positive electrode active material layer on the other surface. The negative electrode current collector 105 has a negative electrode active material layer 106 on one surface, and does not have a negative electrode active material layer on the other surface. The secondary battery 100 includes a gel electrolyte 104 between one surface of the positive electrode current collector 101 and one surface of the negative electrode current collector 105.

The gel electrolyte 104 includes a polymer, an electrolyte, and a solvent. Since the polymer in the gel electrolyte 104 can be gelled, the distance between the positive electrode current collector 101 and the negative electrode current collector 105 can be easily kept constant when the positive electrode current collector 101 and the negative electrode current collector 105 are attached to each other. Consequently, variation in battery reaction rate between surfaces of the current collectors can be prevented, whereby reduction in the capacity of the secondary battery 100 and degradation of the secondary battery 100 can be suppressed.

As the polymer included in the gel electrolyte 104, a polyethylene oxide-based polymer, a polyacrylonitrile-based polymer, a polyvinylidene fluoride-based polymer, a polyacrylate based polymer, or a polymethylmethacrylate-based polymer can be used. In this specification and the like, the term polyvinylidene fluoride-based polymer, for example, refers to a polymer including polyvinylidene fluoride, and includes a poly(vinylidene fluoride-hexafluoropropylene) copolymer and the like.

The above polymer can be qualitatively analyzed using a Fourier transform infrared (FT-IR) spectrometer or the like. For example, the polyvinylidene fluoride-based polymer has an absorption peak showing a C—F bond in a spectrum obtained with the FT-IR spectrometer. Furthermore, the polyacrylonitrile-based polymer has an absorption peak showing a C≡N bond in a spectrum obtained by the FT-IR spectrometer.

As an electrolyte in the gel electrolyte 104, a material having carrier ion mobility and containing lithium ions serving as carrier ions is used. Typical examples of the electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$, and $Li(SO_2F)_2N$. One of these electrolytes may be used alone or two or more of them may be used in an appropriate combination and in an appropriate ratio.

As a solvent of the gel electrolyte 104, a material with the carrier ion mobility is used. As the solvent of the electrolytic solution, an aprotic organic solvent is preferably used. Typical examples of the aprotic organic solvent include ethylene carbonate (EC), propylene carbonate, dimethyl carbonate, diethyl carbonate (DEC), ethylmethyl carbonate (EMC), γ-butyrolactone, acetonitrile, dimethoxyethane, tetrahydrofuran, and the like, and one or more of these materials can be used. When a gelled high-molecular material is used as the solvent of the electrolytic solution or a high-molecular material for gelling is added to the electrolytic solution, safety against liquid leakage and the like is improved. Further, the secondary battery can be thinner and more lightweight. Typical examples of the gelled high-molecular material include a silicone gel, an acrylic gel, an acrylonitrile gel, a poly(ethylene oxide)-based gel, a poly(propylene oxide)-based gel, a gel of a fluorine-based polymer, and the like. Alternatively, the use of one or more of ionic liquids (room temperature molten salts) which have features of non-flammability and non-volatility as a solvent of the electrolytic solution can prevent the secondary battery from exploding or catching fire even when the secondary battery internally shorts out or the internal temperature increases owing to overcharging or the like. An ionic liquid is a salt in the fluid state and has high ion mobility (conductivity). Further, the ionic liquid includes a cation and an anion. Examples of such an ionic liquid are an ionic liquid containing an ethylmethylimidazolium (EMI) cation and an ionic liquid containing an N-methyl-N-propylpiperidinium ($PP_{13}$) cation.

One unit comprises the above-described positive electrode current collector 101, the positive electrode active material layer 102, the separator 103, the gel electrolyte 104, the negative electrode current collector 105, and the negative electrode active material layer 106. The secondary battery 100 includes a plurality of units.

Figure 1B:
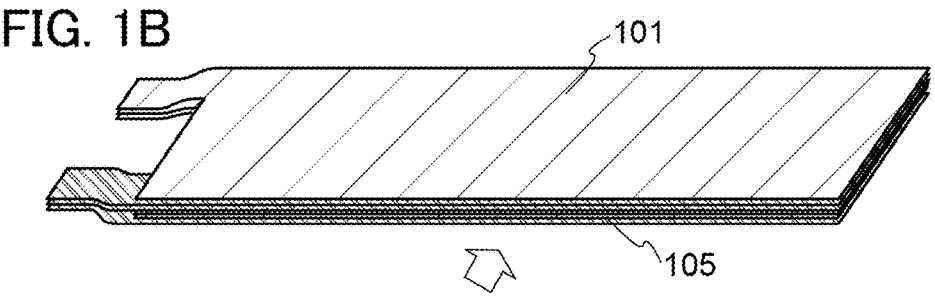
Figure 1C:
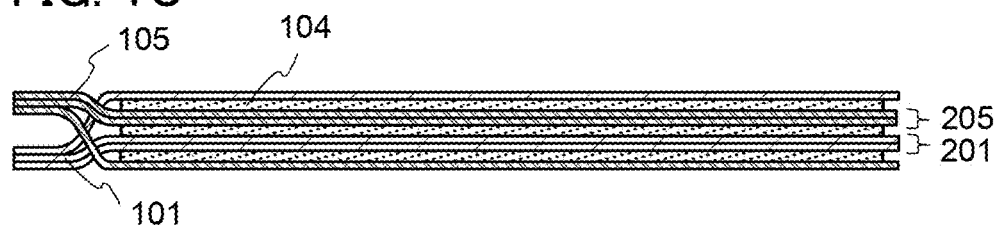

FIGS. 1B and 1C show an example of the secondary battery 100 in which three units are stacked. FIG. 1B is a perspective view of the secondary battery 100, and FIG. 1C is a side view of the secondary battery 100 seen from the direction denoted by the arrow in FIG. 1B. To clarify the explanation, the positive electrode current collector 101, the negative electrode current collector 105, and the gel electrolyte 104 are extracted and illustrated. The plurality of units are arranged such that the other surfaces of the positive electrode current collectors 101 on which the positive electrode active material layers are not provided face each other, and the other surfaces of the negative electrode current collectors 105 on which negative electrode active material layers are not provided face each other. By this arrangement, a contact surface between metals such as a contact surface 201 between the other surfaces of the positive electrode current collectors 101, and a contact surface 205 between the other surfaces of the negative electrode current collectors 105 can be formed.

Figure 1D:
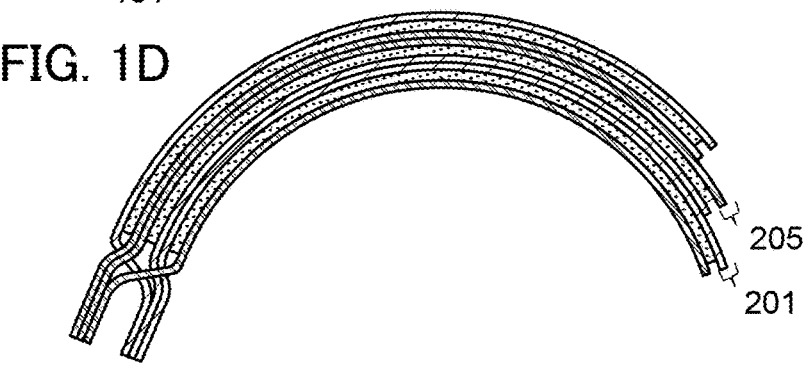

The contact surface 201 and the contact surface 205 which are contact surfaces between metals can have lower friction than a contact surface between the positive electrode active material layer 102 and the separator 103, and a contact surface between the negative electrode active material layer 106 and the separator 103. The secondary battery 100 is formed by stacking units such that the other surfaces of the positive electrode current collectors 101 face each other, and the other surfaces of the negative electrode current collectors 105 face each other, whereby the contact surfaces having low friction slide as illustrated in FIG. 1D when the secondary battery 100 is curved. Thus, stress caused by the difference between the inner diameter and outer diameter of a curved portion can be easily relieved. Such a structure can suppress local generation of highly curved portions and slightly curved portions in current collectors, and suppress variation in the distance between the positive electrode current collector 101 and the negative electrode current collector 105.

For the above described reason, it is preferred that there be no factor increasing the friction, such as a polymer included in the gel electrolyte 104, between the other surfaces of the positive electrode current collectors 101 or between the other surfaces of the negative electrode current collectors 105.

As the friction between the other surfaces of the positive electrode current collectors 101 and that between the other surfaces of the negative electrode current collectors 105 decreases, stress caused by the difference between the inner diameter and outer diameter of the curved portion is easily relieved. However, when the other surfaces of the current collectors are subjected to excessive surface treatment to reduce the friction, the number of steps is increased and productivity is lowered. In addition, the friction between the other surfaces of the positive electrode current collectors 101 and that between the other surfaces of the negative electrode current collectors 105 are not necessarily low. If only one surface of the other surfaces of the positive electrode current collectors 101 or one surface of the other surfaces of the negative electrode current collectors 105 has low friction, stress caused by the difference between the inner diameter and outer diameter of a curved portion, which is generated when the secondary battery 100 is curved, can be sufficiently reduced.

Therefore, more specifically, the static friction coefficient between the other surfaces of the positive electrode current collectors 101 or that between the other surfaces of the negative electrode current collectors 105 is preferably greater than or equal to 0.01 and less than or equal to 0.80, more preferably greater than or equal to 0.20 and less than or equal to 0.65, still more preferably greater than or equal to 0.57 and less than or equal to 0.59. As long as the static friction coefficient is in the above range, stress caused by the difference between the inner diameter and outer diameter of the curved portion, which is generated when the secondary battery 100 is curved, can be sufficiently reduced.

The static friction coefficient in this specification and the like can be obtained as follows. First, a sample for the measurement is put on a flat horizontal glass plate. The sample is in a state in which a material to slide is vertically held between opposite materials. A flat plate and a weight are put on the sample. The opposite materials are fixed, and a load-testing machine is connected to the material to slide, and the load-testing machine is pulled horizontally at approximately 1 mm per second. The maximum value of friction force is measured in a period until the material to slide moves 1 cm. The measurement value is the maximum static friction force. The static friction coefficient is obtained from the maximum static friction force and the load of the flat plate and the weight.

[2. Modification Example]

Although FIG. 1A illustrates an example where the separator 103 exists only in a region between the positive electrode current collector 101 and the negative electrode current collector 105, one embodiment of the present invention is not limited thereto. The separator 103 may be formed to have a bag-like shape to cover the positive electrode current collector 101 or the negative electrode current collector 105.

Figure 2A:
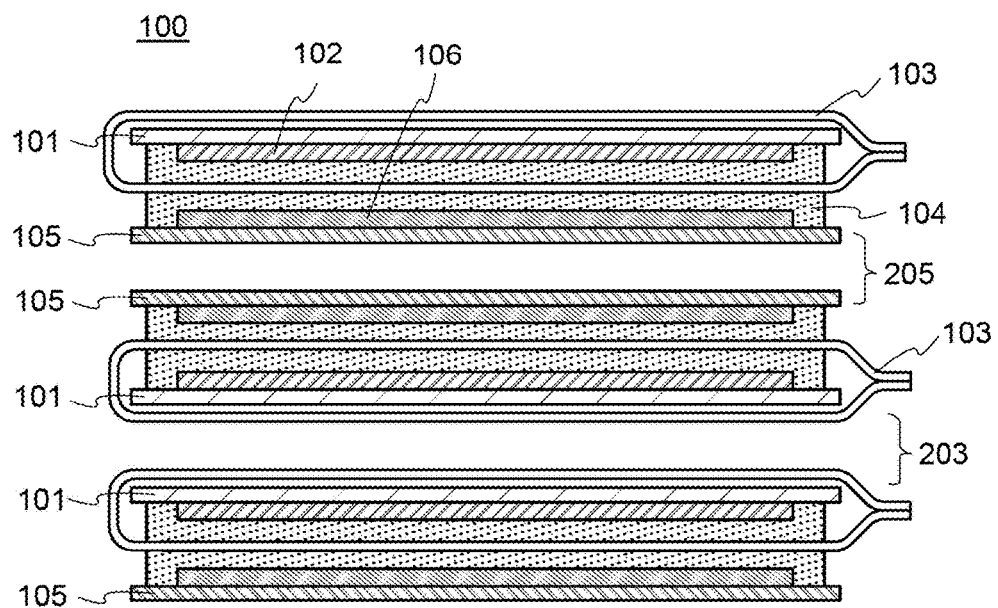
FIGS. 2A and 2B illustrate structure examples of a secondary battery.

In the secondary battery 100 illustrated in FIG. 2A, the separator 103 is provided to cover, like a bag, the positive electrode current collector 101 and the positive electrode active material layer 102. Therefore, the other surfaces of the positive electrode current collectors 101 are not directly in contact with each other, and a contact surface 203 between the separators 103 is formed instead.

Also in that case, as long as friction of the contact surface 205 between the other surfaces of the negative electrode current collectors 105 is low, stress caused by the difference between the inner diameter and outer diameter of a curved portion, which is generated when the secondary battery 100 is curved, can be sufficiently reduced.

Figure 2B:
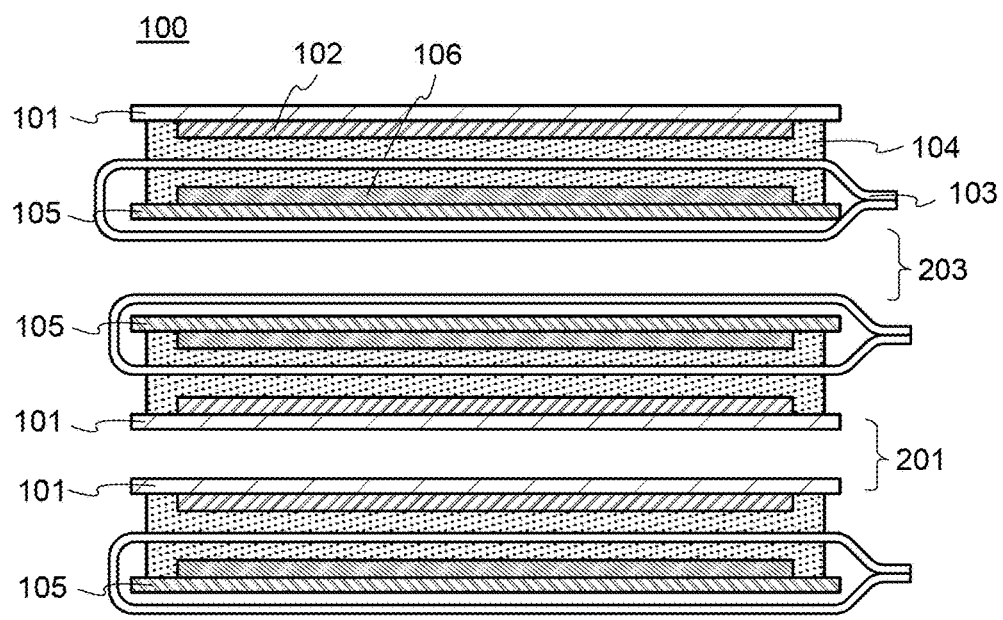

In the secondary battery 100 illustrated in FIG. 2B, the separator 103 is provided to cover, like a bag, the negative electrode current collector 105 and the negative electrode active material layer 106. Therefore, the other surfaces of the negative electrode current collectors 105 are not directly in contact with each other, and a contact surface 203 between the separators 103 is formed instead.

Also in that case, as long as friction of the contact surface 201 between the other surfaces of the negative electrode current collectors 101 is low, stress caused by the difference between the inner diameter and outer diameter of a curved portion, which is generated when the secondary battery 100 is curved, can be sufficiently reduced.

Although FIGS. 1A to 1D and FIGS. 2A and 2B illustrate examples where one unit includes one positive electrode current collector 101, one positive electrode active material layer 102, one separator 103, one negative electrode current collector 105, and one negative electrode active material layer 106, one embodiment of the present invention is not limited thereto. One unit may also include a plurality of positive electrode current collectors 101, a plurality of positive electrode active material layers 102, a plurality of separators 103, a plurality of negative electrode current collectors 105, and a plurality of negative electrode active material layers 106 to the extent that stress caused by the difference between the inner diameter and outer diameter of a curved portion, which is generated when the secondary battery 100 is curved, can be sufficiently reduced.

Figure 3A:
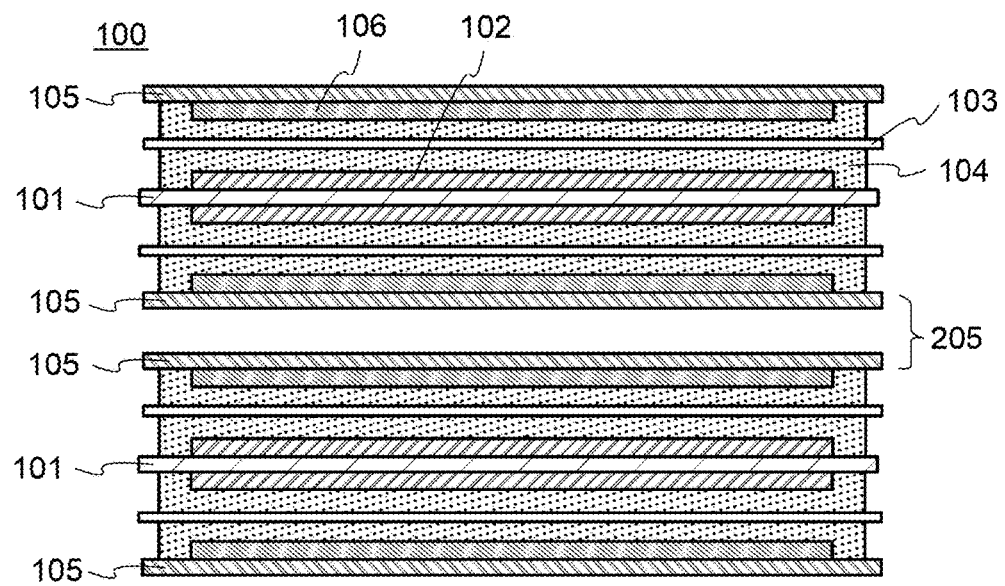
FIGS. 3A and 3B illustrate structure examples of a secondary battery.

In the secondary battery 100 illustrated in FIG. 3A, one unit includes one positive electrode current collector 101 having positive electrode active material layers 102 on both surfaces, two negative electrode current collectors 105 having the negative electrode active material layer 106 on one surface and no negative electrode active material on the other surface, and two separators 103.

In a unit in the secondary battery 100 illustrated in FIG. 3A, the other surfaces of two negative electrode current collectors 105 are positioned on the outermost sides, and the positive electrode current collector 101 having the positive electrode active material layers 102 on the both surfaces exists between the two negative electrode current collectors 105. The units are arranged such that the other surfaces of the negative electrode current collectors 105 face each other. Note that FIG. 3A illustrates the example where one unit includes the two separators 103; however, without being limited thereto, the unit may include one separator which covers, like a bag, the positive electrode current collector 101 as illustrated in FIGS. 2A and 2B.

Figure 3B:
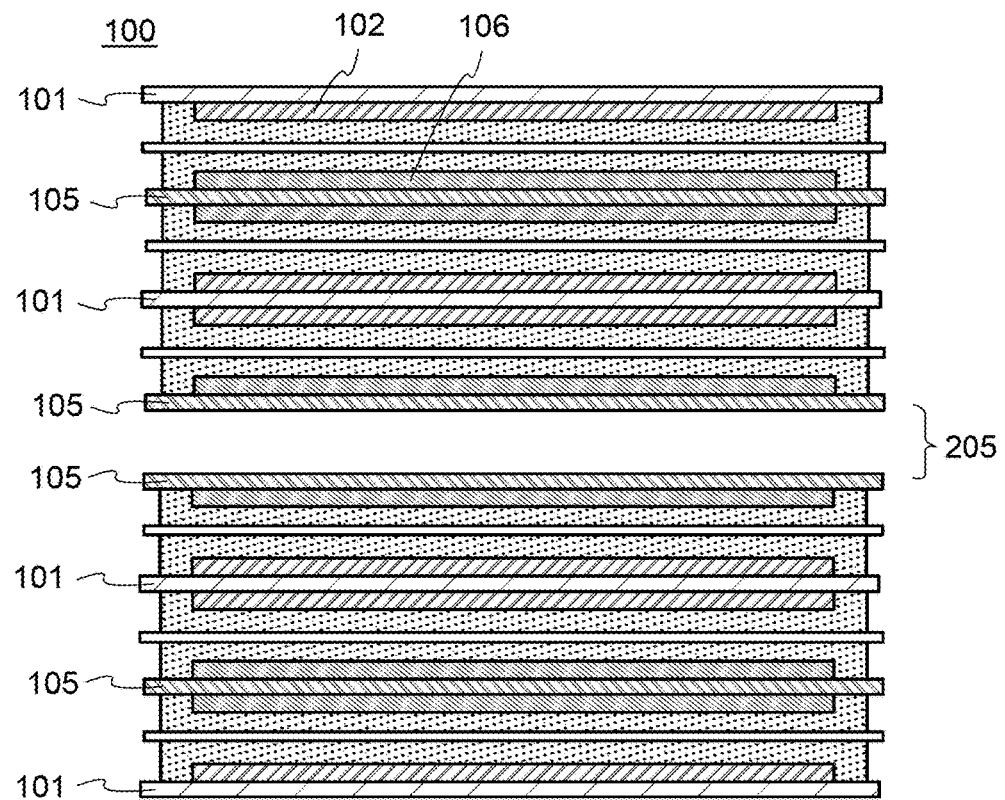

In another example of the secondary battery 100 illustrated in FIG. 3B, one unit includes the positive electrode current collector 101 having the positive electrode active material layer 102 on one surface and no positive electrode active material layer on the other surface, the negative electrode current collector 105 having the negative electrode active material layers 106 on the both surfaces, the positive electrode current collector 101 having the positive electrode current collectors 102 on the both surfaces, and the negative electrode current collector 105 having the negative electrode active material layer 106 on one surface and no negative electrode active material layer on the other surface, which are stacked in this order. The positive electrode current collector 101 having the positive electrode active material layer 102 on one surface and no positive electrode active material layer on the other surface is positioned so that the other surface is on the outermost side of the unit. The negative electrode current collector 105 having the negative electrode current collector 106 on one surface and no negative electrode active material layer on the other surface is positioned so that the other surface is on the outermost side of the unit. In addition, one separator 103 is provided in each of three regions between the positive electrode active material layer 102 and the negative electrode active material layer 106.

Also in the secondary batteries 100 having structures illustrated in FIGS. 3A and 3B, the contact surface 205 between metals having low friction can be made. Therefore, variation in the distance between the positive electrode current collector 101 and the negative electrode current collector 105 can be suppressed.

Although FIGS. 1A to 1D and FIGS. 2A and 2B show the secondary battery including three units and FIGS. 3A and 3B show the secondary battery including two units, they are extracted for simplicity. Practically, the secondary battery 100 preferably includes three or more units. The capacity of the secondary battery 100 can be increased by stacking a plurality of units.

One embodiment of the present invention can be used not only for the secondary battery but also for various power storage devices. Examples of such a power storage device include a battery, a primary battery, a secondary battery, a lithium-ion secondary battery, a lithium air battery, a solid-state battery, a lead storage battery, a lithium-ion polymer secondary battery, a nickel-hydrogen storage battery, a nickel-cadmium storage battery, a nickel-iron storage battery, a nickel-zinc storage battery, and a silver oxide-zinc storage battery. In addition, a capacitor is given as another example of the power storage devices. For example, with a combination of the negative electrode of one embodiment of the present invention and an electric double layer positive electrode, a capacitor such as a lithium ion capacitor can be manufactured.

In Embodiment 1, one embodiment of the present invention has been described. Other embodiments of the present invention are described in Embodiments 2 to 5. Note that one embodiment of the present invention is not limited thereto. For example, although an example where the gel electrolyte includes a polymer is given as one embodiment of the present invention, one embodiment of the present invention is not limited thereto. Depending on circumstances or conditions, in one embodiment of the present invention, an electrolyte may include a substance other than a polymer. Alternatively, depending on circumstances or conditions, in one embodiment of the present invention, the electrolyte does not necessarily include a polymer. For example, the example in which the secondary battery is curved is shown, one embodiment of the present invention is not limited thereto. Depending on the circumstances or conditions, in one embodiment of the present invention, the power storage device may be transformed by bending or straightening as required, or may be transformed to have some desired shape and the shape may be kept. Alternatively, for example, depending on circumstances or conditions, the power storage device is not necessarily curved in one embodiment of the present invention.

Embodiment 2

In one embodiment of the present invention, a specific structure and a specific material of the secondary battery of one embodiment of the present invention are described with reference to FIG. 4 and FIGS. 5A and 5B. In this embodiment, an example where one of a positive electrode and a negative electrode is covered with a bag-like separator will be described below.

Figure 4:
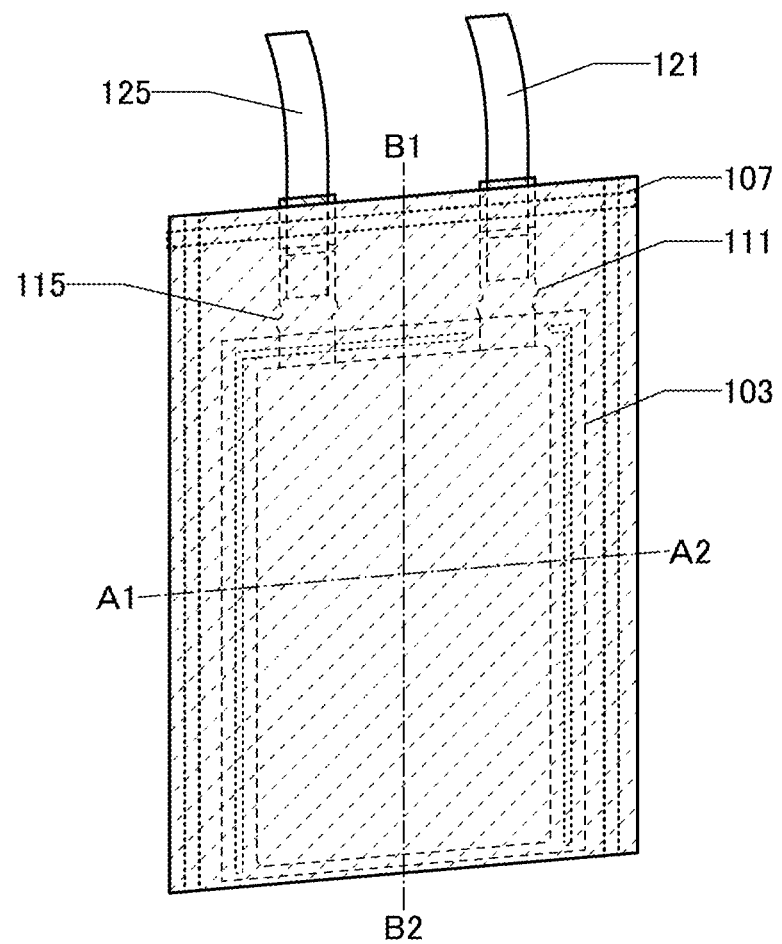
FIG. 4 illustrates an example of a secondary battery.

FIG. 4 is a perspective view showing an appearance of the secondary battery 100. FIG. 5A is a cross-sectional view taken along dashed-dotted line A1-A2 in FIG. 4. FIG. 5B is a cross-sectional view of a portion indicated by the dashed-dotted line B1-B2 in FIG. 4.

The secondary battery 100 of one embodiment of the present invention includes a positive electrode 111 covered with the separator 103, a negative electrode 115, and the gel electrolyte 104 in an exterior body 107. Note that FIGS. 5A and 5B illustrate an example of a secondary battery including three units. The positive electrode 111 is electrically connected to a positive electrode lead 121. The negative electrode 115 is electrically connected to a negative electrode lead 125. Each of the positive electrode lead 121 and the negative electrode lead 125 is also referred to as a lead electrode or a lead terminal. Parts of the positive electrode lead 121 and the negative electrode lead 125 are positioned outside the exterior body. The secondary battery 100 is charged and discharged through the positive electrode lead 121 and the negative electrode lead 125.

Figure 5A:
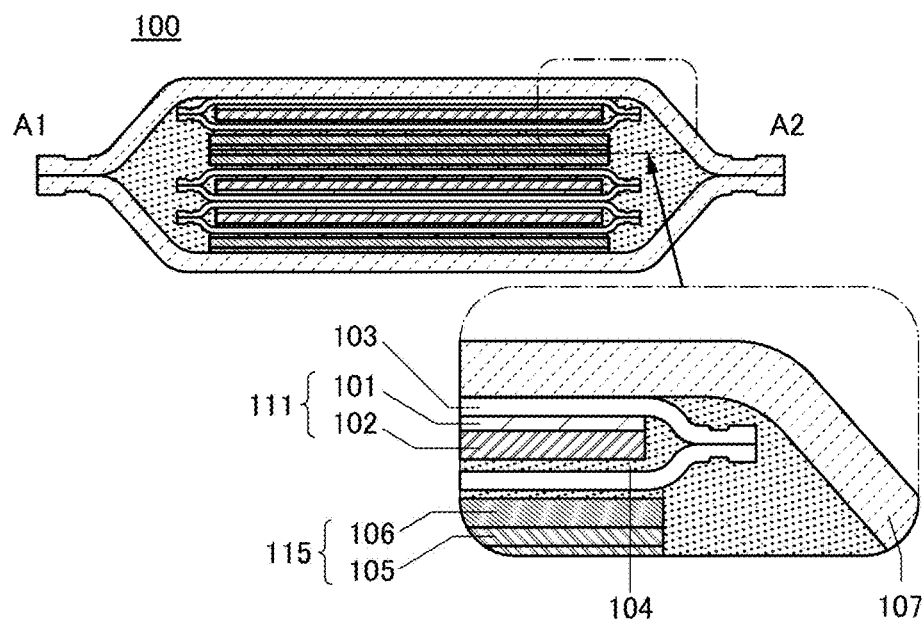
FIGS. 5A and 5B illustrate an example of a secondary battery.
Figure 5B:
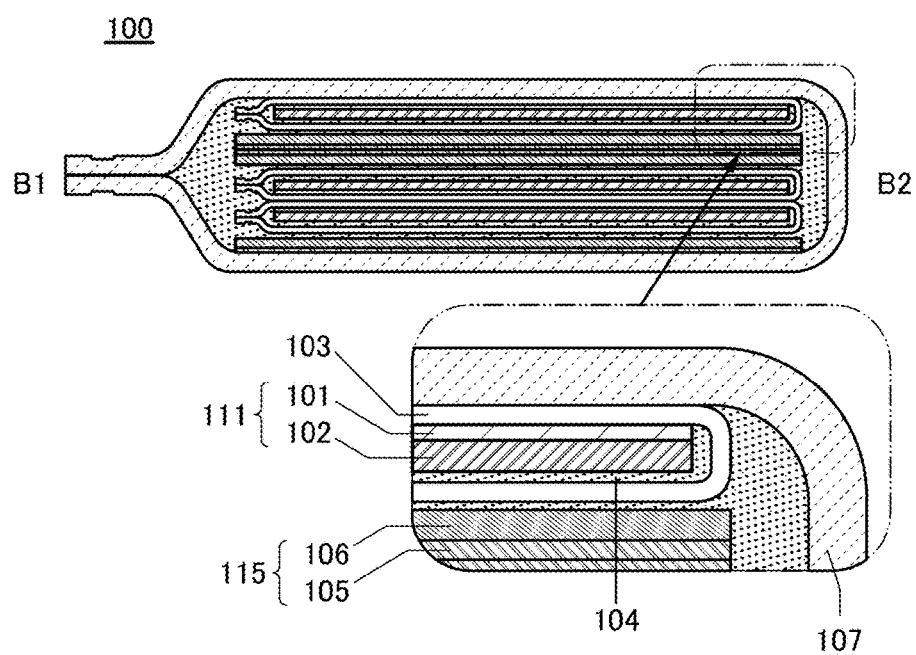

Although FIGS. 5A and 5B illustrate the example in which the positive electrode 111 is covered with the separator 103, one embodiment of the present invention is not limited thereto. For example, the positive electrode 111 is not necessarily covered with the separator 103; instead of the positive electrode 111, the negative electrode 115 may be covered with the separator 103.

[1. Positive Electrode]

The positive electrode 111 includes the positive electrode current collector 101, the positive electrode active material layer 102 formed on the positive electrode current collector 101, and the like. Although an example in which the positive electrode active material layer 102 is provided on one surface of the positive electrode current collector 101 with a sheet form (or a strip-like form) is described in FIGS. 5A and 5B, the positive electrode active material layers 102 may be provided on both surfaces of the positive electrode current collector 101 as described in Embodiment 1 in accordance with the structure of a unit of the secondary battery 100. Providing the positive electrode active material layers 102 on both surfaces of the positive electrode current collector 101 allows the secondary battery 100 to have high capacity.

The positive electrode current collector 101 can be formed using a material that has high conductivity and does not cause a significant chemical change, such as a metal typified by stainless steel, gold, platinum, aluminum, or titanium, or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The positive electrode current collector 101 can have a foil-like shape, a plate-like shape (a sheet-like shape), a net-like shape, a punching-metal shape, an expanded-metal shape, or the like as appropriate. The positive electrode current collector 101 preferably has a thickness of greater than or equal to 5 μm and less than or equal to 30 μm. The surface of the positive electrode current collector 101 may be provided with an undercoat using graphite or the like.

The positive electrode active material layer 102 may further include a binder for increasing adhesion of positive electrode active materials, a conductive additive for increasing the conductivity of the positive electrode active material layer 102, and the like in addition to the positive electrode active material.

Examples of positive electrode active materials that can be used for the positive electrode active material layer 102 include a composite oxide with an olivine structure, a composite oxide with a layered rock-salt structure, and a composite oxide with a spinel structure. As the positive electrode active material, a compound such as $LiFeO_2$, $LiCoO_2$, $LiNiO_2$, $LiMn_2O_4$, $V_2O_5$, $Cr_2O_5$, and $MnO_2$ can be used.

$LiCoO_2$ is particularly preferable because it has high capacity, stability in the air higher than that of $LiNiO_2$, and thermal stability higher than that of $LiNiO_2$, for example.

It is preferable to add a small amount of lithium nickel oxide ($LiNiO_2$ or $LiNi_{1-x}M_xO_2$ (M=Co, Al, or the like)) to a lithium-containing material with a spinel crystal structure which contains manganese such as $LiMn_2O_4$ because characteristics of the secondary battery using such a material can be improved.

Alternatively, a complex material ($LiMPO_4$ (general formula) (M is one or more of Fe(II), Mn(II), Co(II), and Ni(II))) can be used. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

$LiFePO_4$ is particularly preferable because it meets requirements with balance for a positive electrode active material, such as safety, stability, high capacity density, and the existence of lithium ions that can be extracted in initial oxidation (charging).

Alternatively, a complex material such as $Li_{(2-j)}MSiO_4$ (general formula) (M is one or more of Fe(II), Mn(II), Co(II), and Ni(II); 0≤j≤2) may be used. Typical examples of the general formula $Li_{(2-j)}MSiO_4$ which can be used as a material are lithium compounds such as $Li_{(2-j)}FeSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a nasicon compound expressed by $A_xM_2(XO_4)_3$ (general formula) (A=Li, Na, or Mg, M=Fe, Mn, Ti, V, or Nb, X=S, P, Mo, W, As, or Si) can be used for the positive electrode active material. Examples of the nasicon compound are $Fe_2(MnO_4)_3$, $Fe_2(SO_4)_3$, and $Li_3Fe_2(PO_4)_3$. Still further alternatively, compounds represented by a general formula, $Li_2MPO_4F$, $Li_2MP_2O_7$, and $Li_5MO_4$ (M=Fe or Mn), a perovskite fluoride such as $NaFeF_3$ and $FeF_3$, a metal chalcogenide (a sulfide, a selenide, and a telluride) such as $TiS_2$ and $MoS_2$, an oxide with an inverse spinel crystal structure such as $LiMVO_4$, a vanadium oxide (e.g., $V_2O_5$, $V_6O_{13}$, and $LiV_3O_8$), a manganese oxide, and an organic sulfur compound can be used as the positive electrode active material, for example.

In the case where carrier ions are alkali metal ions other than lithium ions or alkaline-earth metal ions, the positive electrode active material may contain, instead of lithium, an alkali metal (e.g., sodium or potassium) or an alkaline-earth metal (e.g., calcium, strontium, barium, beryllium, or magnesium). For example, the positive electrode active material may be a layered oxide containing sodium such as $NaFeO_2$ or $Na_{2/3}[Fe_{1/2}Mn_{1/2}]O_2$.

Further alternatively, any of the aforementioned materials may be combined to be used as the positive electrode active material. For example, a solid solution obtained by combining two or more of the above materials can be used as the positive electrode active material. For example, a solid solution of $LiCo_{1/3}Mn_{1/3}Ni_{1/3}O_2$ and $Li_2MnO_3$ can be used as the positive electrode active material.

Note that although not shown, a conductive material such as a carbon layer may be provided on a surface of the positive electrode active material layer 102. With the conductive material such as the carbon layer, conductivity of the electrode can be increased. For example, the positive electrode active material layer 102 can be coated with the carbon layer by mixing a carbohydrate such as glucose at the time of baking the positive electrode active material.

The average particle diameter of the primary particle of the positive electrode active material layer 102 is preferably greater than or equal to 50 nm and less than or equal to 100 µm.

Examples of the conductive additive include acetylene black (AB), graphite (black lead) particles, carbon nanotubes, graphene, and fullerene.

A network for electron conduction can be formed in the positive electrode 111 by the conductive additive. The conductive additive also allows maintaining of a path for electric conduction between the particles of the positive electrode active material layer 102. The addition of the conductive additive to the positive electrode active material layer 102 increases the electron conductivity of the positive electrode active material layer 102.

As the binder, instead of polyvinylidene fluoride (PVDF) as a typical one, polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, nitrocellulose or the like can be used.

The content of the binder in the positive electrode active material layer 102 is preferably greater than or equal to 1 wt % and less than or equal to 10 wt %, more preferably greater than or equal to 2 wt % and less than or equal to 8 wt %, and still more preferably greater than or equal to 3 wt % and less than or equal to 5 wt %. The content of the conductive additive in the positive electrode active material layer 102 is preferably greater than or equal to 1 wt % and less than or equal to 10 wt %, more preferably greater than or equal to 1 wt % and less than or equal to 5 wt %.

In the case where the positive electrode active material layer 102 is formed by a coating method, the positive electrode active material, the binder, and the conductive additive are mixed to form a positive electrode paste (slurry), and the positive electrode paste is applied to the positive electrode current collector 101 and dried.

[2. Negative Electrode]

The negative electrode 115 includes, for example, the negative electrode current collector 105 and the negative electrode active material layer 106 formed on the negative electrode current collector 105. Although an example in which the negative electrode active material layer 106 is provided on one surface of the negative electrode current collector 105 with a sheet form (or a strip-like form) is described in FIGS. 5A and 5B, the negative electrode active material layers 106 may be provided on both surfaces of the negative electrode current collector 105 as described in Embodiment 1 in accordance with the structure of a unit of the secondary battery 100. Providing the negative electrode active material layers 106 on both surfaces of the negative electrode current collector 105 allows the secondary battery 100 to have high capacity.

The negative electrode current collector 105 can be formed using a material that has high conductivity and is not alloyed with a carrier ion of lithium or the like, such as stainless steel, gold, platinum, iron, copper, titanium, or an alloy thereof. Alternatively, an aluminum alloy to which an element which improves heat resistance, such as silicon, titanium, neodymium, scandium, or molybdenum, is added can be used. The negative electrode current collector 105 can have a foil-like shape, a plate-like shape (a sheet-like shape), a net-like shape, a punching-metal shape, an expanded-metal shape, or the like as appropriate. The negative electrode current collector 105 preferably has a thickness greater than or equal to 5 µm and less than or equal to 30 µm. The surface of the negative electrode current collector 105 may be provided with an undercoat using graphite or the like.

The negative electrode active material layer 106 may further include a binder for increasing adhesion of negative electrode active materials, a conductive additive for increasing the conductivity of the negative electrode active material layer 106, and the like in addition to the negative electrode active materials.

There is no particular limitation on the negative electrode active material as long as it is a material with which lithium can be dissolved and precipitated or a material into/from which lithium ions can be inserted and extracted. Other than a lithium metal or lithium titanate, a carbon-based material generally used in the field of power storage, or an alloy-based material can also be used as the negative electrode active material layer 106.

The lithium metal is preferable because of its low redox potential (−3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (0.1 V to 0.3 V vs. Li/Li$^+$) when lithium ions are inserted into the graphite (when a lithium-graphite intercalation compound is formed). For this reason, a lithium ion battery can have a high operating voltage. In addition, graphite is preferable because of its advantages such as relatively high capacity per unit volume, small volume expansion, low cost, and safety greater than that of a lithium metal.

For the negative electrode active material, an alloy-based material or oxide which enables charge-discharge reaction by an alloying reaction and a dealloying reaction with lithium can be used. In the case where lithium ions are carrier ions, the alloy-based material is, for example, a material containing at least one of Mg, Ca, Al, Si, Ge, Sn, Pb, Sb, Bi, Ag, Au, Zn, Cd, Hg, In, and the like. Such elements have higher capacity than carbon. In particular, silicon has a significantly high theoretical capacity of 4200 mAh/g. For this reason, silicon is preferably used as the negative electrode active material. Examples of the alloy-based material using such elements include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, $InSb$, $SbSn$, and the like.

Alternatively, for the negative electrode active material, an oxide such as SiO, SnO, $SnO_2$, titanium oxide ($TiO_2$), lithium titanium oxide ($Li_4Ti_5O_{12}$), lithium-graphite intercalation compound ($Li_xC_6$), niobium oxide ($Nb_2O_5$), tungsten oxide ($WO_2$), or molybdenum oxide ($MoO_2$) can be used.

Still alternatively, as the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N$ is preferable because of high charge and discharge capacity (900 mAh/g and 1890 $mAh/cm^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. Note that in the case of using a material containing lithium ions as a positive electrode active material, the nitride containing lithium and a transition metal can be used as the negative electrode active material by extracting the lithium ions contained in the positive electrode active material in advance.

Alternatively, a material which causes a conversion reaction can be used as the negative electrode active material. For example, a transition metal oxide with which an alloying reaction with lithium is not caused, such as cobalt oxide (CoO), nickel oxide (NiO), or iron oxide (FeO), may be used for the negative electrode active material. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, or CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high electrode potential.

In the case where the negative electrode active material layer 106 is formed by a coating method, the negative electrode active material and the binder are mixed to form a negative electrode paste (slurry), and the negative electrode paste is applied to the negative electrode current collector 105 and dried. Note that a conductive additive may be added to the negative electrode paste.

Graphene may be formed on a surface of the negative electrode active material layer 106. In the case of using silicon as the negative electrode active material, the volume of silicon is greatly changed due to occlusion and release of carrier ions in charge-discharge cycles. Therefore, adhesion between the negative electrode current collector 105 and the negative electrode active material layer 106 is decreased, resulting in degradation of battery characteristics caused by charge and discharge. Thus, graphene is preferably formed on a surface of the negative electrode active material layer 106 containing silicon because even when the volume of silicon is changed in charge-discharge cycles, decrease in the adhesion between the negative electrode current collector 105 and the negative electrode active material layer 106 can be inhibited, which makes it possible to reduce degradation of battery characteristics.

Alternatively, a coating film of an oxide or the like may be formed on the surface of the negative electrode active material layer 106. A coating film formed by decomposition or the like of an electrolyte solution or the like in charging cannot release electric charges used at the formation, and therefore forms irreversible capacity. In contrast, the film of an oxide or the like provided on the surface of the negative electrode active material layer 106 in advance can reduce or prevent generation of irreversible capacity.

As the coating film coating the negative electrode active material layer 106, an oxide film of any one of niobium, titanium, vanadium, tantalum, tungsten, zirconium, molybdenum, hafnium, chromium, aluminum, and silicon or an oxide film containing any one of these elements and lithium can be used. Such a film is denser than a conventional film formed on a surface of a negative electrode due to a decomposition product of an electrolyte solution.

For example, niobium oxide ($Nb_2O_5$) has a low electric conductivity of $10^{-9}$ S/cm and a high insulating property. For this reason, a niobium oxide film inhibits electrochemical decomposition reaction between the negative electrode active material and the electrolyte solution. On the other hand, niobium oxide has a lithium diffusion coefficient of $10^{-9}$ $cm^2$/sec and high lithium ion conductivity. Therefore, niobium oxide can transmit lithium ions. Alternatively, silicon oxide or aluminum oxide may be used.

A sol-gel method can be used to coat the negative electrode active material layer 106 with the coating film, for example. The sol-gel method is a method for forming a thin film in such a manner that a solution of metal alkoxide, a metal salt, or the like is changed into a gel, which has lost its fluidity, by hydrolysis reaction and polycondensation reaction and the gel is baked. Since a thin film is formed from a liquid phase in the sol-gel method, raw materials can be mixed uniformly on the molecular scale. For this reason, by adding a negative electrode active material such as graphite to a raw material of the metal oxide film which is a solvent, the active material can be easily dispersed into the gel. In such a manner, the coating film can be formed on the surface of the negative electrode active material layer 106. A decrease in the capacity of the power storage unit can be prevented by using the coating film.

[3. Separator]

As a material of the separator 103, a porous insulator such as cellulose, polypropylene (PP), polyethylene (PE), polybutene, nylon, polyester, polysulfone, polyacrylonitrile, polyvinylidene fluoride, or tetrafluoroethylene can be used. Alternatively, nonwoven fabric of a glass fiber or the like, or a diaphragm in which a glass fiber and a polymer fiber are mixed may be used.

[4. Electrolyte Solution]

For an electrolyte solution which is a material of the gel electrolyte 104 used for the secondary battery 100, refer to the description in Embodiment 1.

[5. Exterior Body]

There are a variety of structures of a secondary battery, and a film is used for formation of the exterior body 107 in this embodiment. Note that the film used for the exterior body 107 is a single-layer film selected from a metal film (e.g., an aluminum film, a stainless steel film, and a nickel steel film), a plastic film made of an organic material, a hybrid material film including an organic material (e.g., an organic resin or fiber) and an inorganic material (e.g., ceramic), and a carbon-containing inorganic film (e.g., a carbon film or a graphite film); or a stacked-layer film including two or more of the above films. Forming a depression or a projection on a surface of a metal film by embossing increases the surface area of the exterior body 107 exposed to outside air, achieving efficient heat dissipations.

In the case where the secondary battery 100 is changed in form by externally applying force, bending stress is externally applied to the exterior body 107 of the secondary battery 100. This might partly deform or damage the exterior body 107. Projections or depressions formed on the exterior body 107 can relieve a strain caused by stress applied to the exterior body 107. Therefore, the secondary battery 100 can have high reliability. Note that a "strain" is the scale of change in form indicating the displacement of a point of an object relative to the reference (initial) length of the object. The exterior body 107 having depressions or projections can reduce the influence of a strain caused by application of external force to the power storage unit to an acceptable level. Thus, the power storage unit having high reliability can be provided.

This embodiment can be implemented in appropriate combination with any of the other embodiments and example.

Embodiment 3

In this embodiment, an example of a method for manufacturing the secondary battery 100 will be described with reference to FIGS. 6A to 6D, FIGS. 7A to 7C, FIGS. 8A and 8B, FIGS. 9A and 9B, FIGS. 10A to 10C, and FIGS. 11A and 11B.

[1. Covering Positive Electrode with Separator]

Figure 6A:
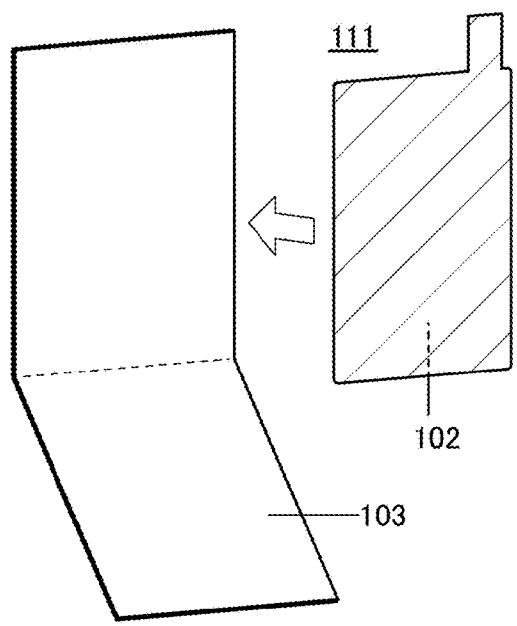
FIGS. 6A to 6D illustrate an example of a manufacturing method of a secondary battery.
Figure 6B:
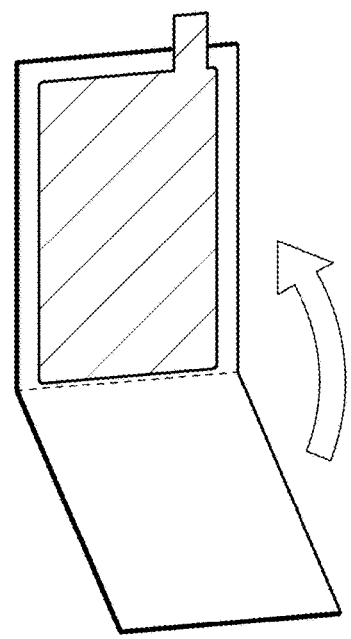
Figure 6C:
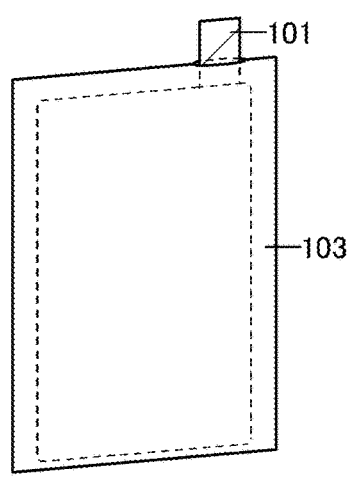

First, the positive electrode 111 in which the positive electrode active material layer 102 is formed is positioned over the separator 103 (see FIG. 6A). In this embodiment, an example where the positive electrode active material layer 102 is provided on only one surface of a positive electrode current collector is shown. Therefore, the positive electrode 111 does not have the positive electrode active material layer 102 on a surface illustrated in FIG. 6A, and has the positive electrode active material layer 102 on the other surface. Next, the separator 103 is folded along a dotted line in FIG. 6A (see FIG. 6B) so that the positive electrode 111 is interposed between the surfaces of the separator 103 (see FIG. 6C).

Figure 6D:
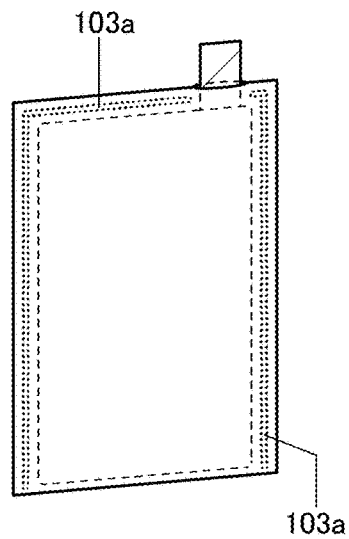

Then, the outer edges of the separator 103 outside the positive electrode 111 are bonded to form the bag-like separator 103 (see FIG. 6D). The bonding of the outer edges of the separator 103 can be performed with the use of an adhesive or the like, by ultrasonic welding, or by thermal fusion bonding.

In this embodiment, polypropylene is used as the separator 103, and the outer edges of the separator 103 are bonded by heating. A bonding portion 103a is shown in FIG. 6D. In this manner, the positive electrode 111 can be covered with the separator 103. The separator 103 is formed so as to cover the positive electrode active material layer 102 and does not necessarily cover the whole positive electrode 111.

Note that although the separator 103 is folded in FIGS. 6A to 6D, one embodiment of the present invention is not limited thereto. For example, the positive electrode 111 may be interposed between two separators. In that case, the bonding portion 103a may be formed to surround almost all of four sides of the separators.

The outer edges of the separator 103 may be bonded, using dashed line-like or dot-like bonding portions provided at regular intervals.

Alternatively, bonding may be performed on only one side of the outer edges. Alternatively, bonding may be performed on only two sides of the outer edges. Alternatively, bonding may be performed on four sides of the outer edges. Accordingly, the four sides can be in an even state.

Note that although the case where the positive electrode 111 is covered with the separator 103 is shown in FIGS. 6A to 6D and the like, one embodiment of the present invention is not limited thereto. For example, the positive electrode 111 is not necessarily covered with the separator 103; the negative electrode 115 may be covered with the separator 103 instead of the positive electrode 111.

[2. Bonding at Side of Exterior Body]

Next, a film used as an exterior body is folded along a dotted line (see FIG. 7A), and thermocompression bonding is performed along one side of the folded exterior body 107. A portion where thermocompression bonding is performed along one side of the exterior body 107 is shown as a bonding portion 107a in FIG. 7B.

[3. Forming Unit by Overlapping Positive Electrode and Negative Electrode with Each Other]

Figure 7A:
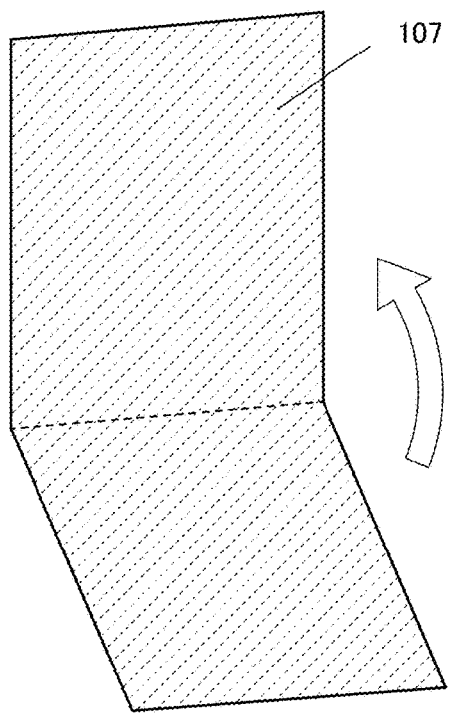
FIGS. 7A to 7C illustrate an example of a manufacturing method of a secondary battery.
Figure 7B:
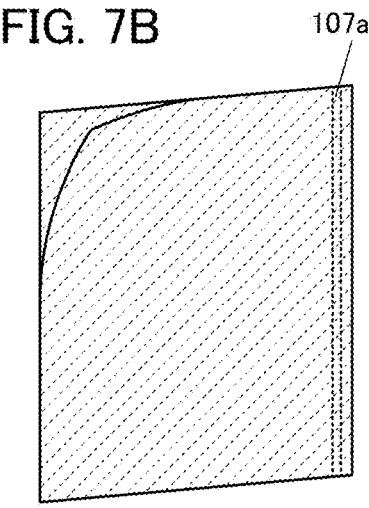
Figure 7C:
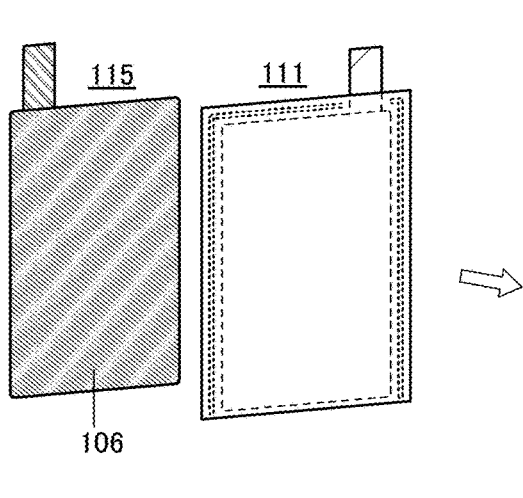
Figure 7C:
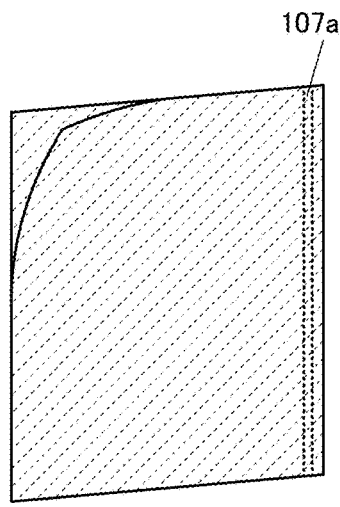

Then, the positive electrode 111 and the negative electrode 115 which are included in one unit are overlapped with each other, which is covered by the exterior body 107 (see FIG. 7C). Here, as described in Embodiment 1, the positive electrode active material layer 102 and the negative electrode active material layer 106 are arranged to face each other with the separator 103 provided therebetween in one unit. A surface of the positive electrode current collector 101 on which a positive electrode active material is not provided or a surface of the negative electrode current collector 105 on which a negative electrode active material is not provided is arranged on the outermost side of the unit. This embodiment shows an example in which one unit includes one positive electrode current collector 101, one positive electrode active material layer 102, one separator 103, one negative electrode current collector 105, and one negative electrode active material layer 106.

Next, thermocompression bonding is performed along a side of the exterior body 107 other than the side where bonding is performed in the above step. A portion where thermocompression bonding is performed along the side of the exterior body 107 is shown as the bonding portion 107a in FIG. 8A, like the portion where thermocompression bonding is performed along the side of the exterior body 107 in the above step.

Figure 8A:
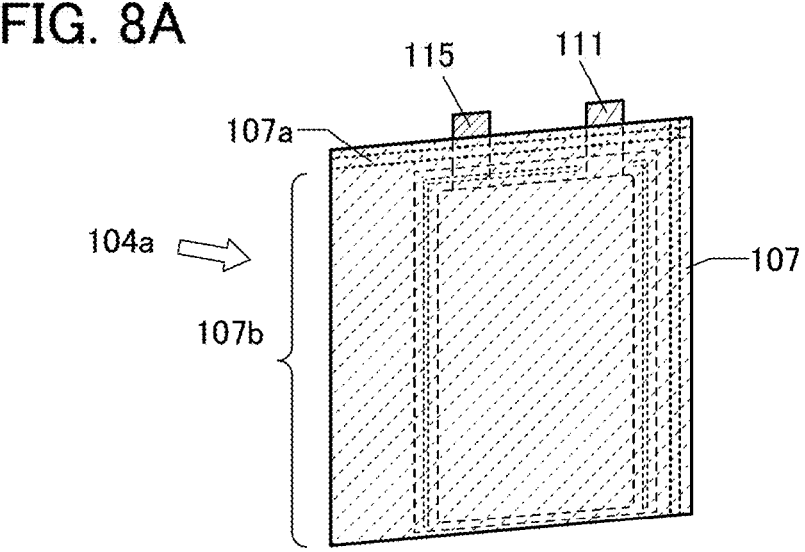
FIGS. 8A and 8B illustrate an example of a manufacturing method of a secondary battery.

Then, an electrolyte solution 104a which is a material of the gel electrolyte 104 is injected from an unsealed side 107b of the exterior body 107 illustrated in FIG. 8A into a region covered with the exterior body 107. The electrolyte solution 104a includes a material of a polymer, an electrolyte, and a solvent. Then, the side 107b of the exterior body 107 is sealed under vacuum, heat, and pressure. This treatment is performed in an environment from which oxygen is eliminated, for example, in a glove box. The evacuation to a vacuum may be performed with a vacuum sealer, a liquid pouring sealer, or the like. Heating and pressing can be performed by setting the exterior body 107 between two heatable bars included in the sealer. An example of the conditions is as follows: the degree of vacuum is 60 kPa, the heating temperature is 190° C., the pressure is 0.1 MPa, and the time is 3 seconds.

Then, the material of a polymer included in the electrolyte solution 104a is sufficiently gelled, so that the gel electrolyte 104 is formed. Here, pressure may be applied to the unit through the exterior body 107. The application of pressure enables removal of bubbles which enter between the positive electrode and the negative electrode when the electrolyte solution 104a is injected.

[4. Taking Unit Out and Removing Unnecessary Gel Electrolyte]

Figure 8B:
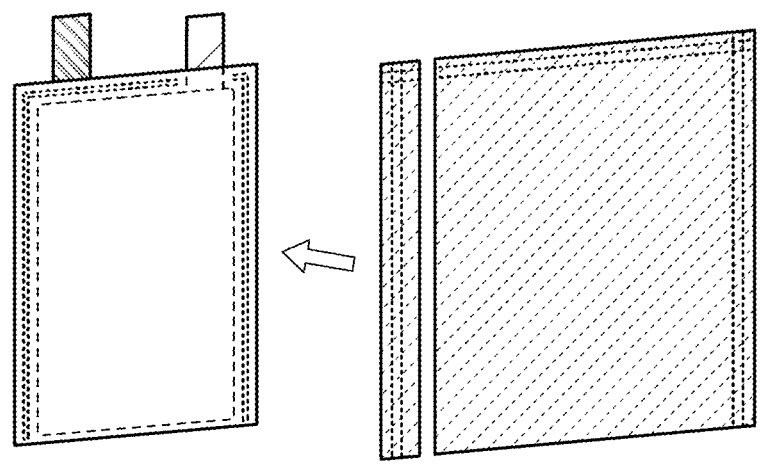

Next, the exterior body 107 is cut and unsealed, and a unit is taken out (see FIG. 8B). The positive electrode current collector 101 and the negative electrode current collector 105 are bonded to each other with the gel electrolyte 104 in a region where the positive electrode active material layer 102 and the negative electrode active material layer 106 face each other in the unit. Thus, the gel electrolyte 104 which is attached to the outer surfaces of the unit is removed while the gel electrolyte 104 which bonds the positive electrode current collector 101 to the negative electrode current collector 105 is retained. By removing the gel electrolyte 104 attached to the outer surfaces of the unit, friction between the surfaces of the positive electrode current collectors 101 on which positive electrode active materials are not provided or friction between the surfaces of the negative electrode current collectors 105 on which negative electrode active materials are not provided can be reduced.

There is no particular limitation on a method for removing unnecessary portions of the gel electrolyte 104. For example, a sheet is attached in advance to the surface of the positive electrode current collector 101 on which a positive electrode active material is not provided or the surface of the negative electrode current collector 105 on which a negative electrode active material is not provided, and the sheet is removed together with the gel electrolyte 104. Alternatively, the gel electrolyte 104 may be wiped off with a cloth or a waste cloth.

[5. Stacking Units and Connecting Units to Lead]

Next, a plurality of units fabricated as described above are stacked (see FIG. 9A). In this embodiment, an example in which three units are used is shown. Here, as described in Embodiment 1, the units are arranged so that the other surfaces of the negative electrode current collectors 105 face each other. Alternatively, the units are arranged so that the surfaces of the separators covering the positive electrode current collectors face each other.

Next, the positive electrode lead 121 including a sealing layer 120 is electrically connected to positive electrode tabs of the plurality of positive electrode current collectors 101 by ultrasonic wave irradiation while pressure is applied (ultrasonic welding).

The lead electrode is likely to be cracked or cut by a stress due to an external force applied after fabrication of the secondary battery 100.

Figure 9A:
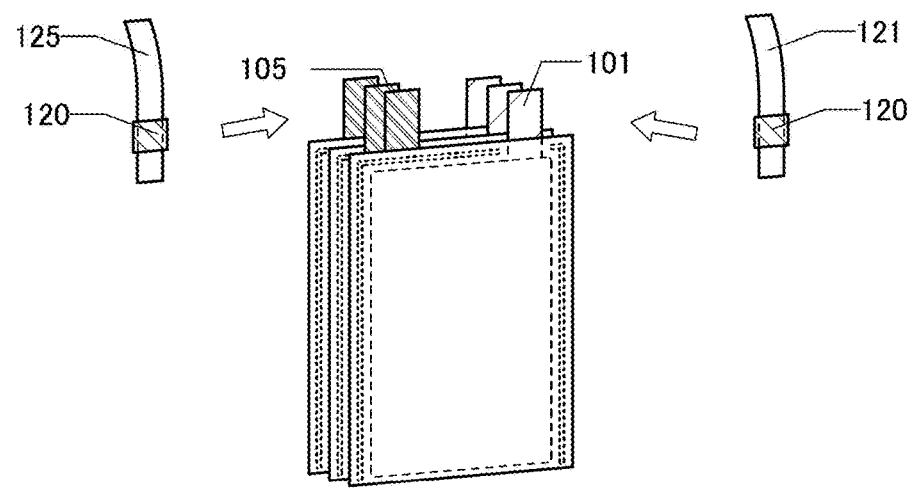
FIGS. 9A and 9B illustrate an example of a manufacturing method of a secondary battery.
Figure 9B:
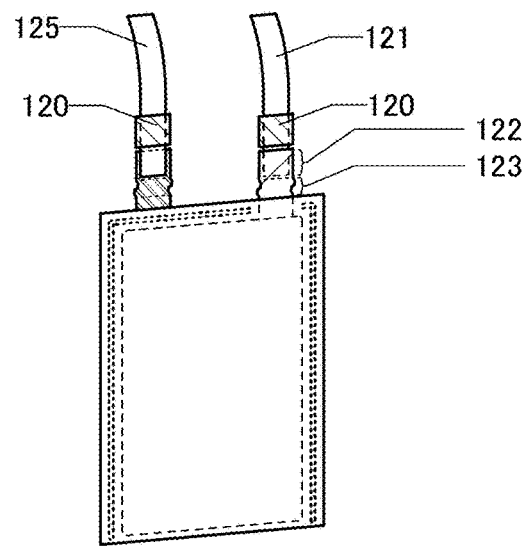

Here, when subjected to ultrasonic welding, the positive electrode lead 121 and the positive current collector 101 are placed between bonding dies provided with projections, whereby a connection region 122 and a bent portion 123 can be formed in the positive electrode tab (see FIG. 9B).

This bent portion 123 can relieve stress due to external force applied after fabrication of the secondary battery 100. Accordingly, the reliability of the secondary battery 100 can be increased.

The bent portion 123 is not necessarily formed in the positive electrode tab. The positive electrode current collector may be formed using a high-strength material such as stainless steel to a thickness of 10 μm or less, in order to easily relieve stress due to external force applied after fabrication of a secondary battery.

It is needless to say that two or more of the above examples may be combined to relieve concentration of stress in the positive electrode tab.

Then, in a manner similar to that of the positive electrode current collector 101, the negative electrode lead 125 including the sealing layer 120 is electrically connected to the negative electrode tab of the negative electrode current collector 105 by ultrasonic welding.

[6. Resealing]

Figure 10A:
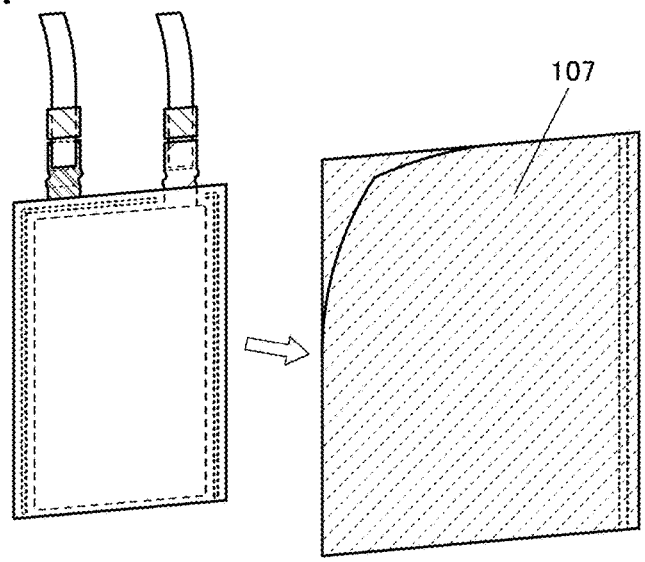
FIGS. 10A to 10C illustrate an example of a manufacturing method of a secondary battery.
Figure 10B:
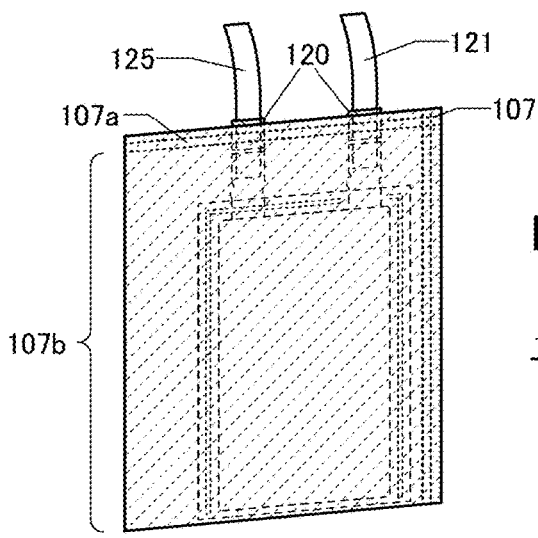
Figure 10C:
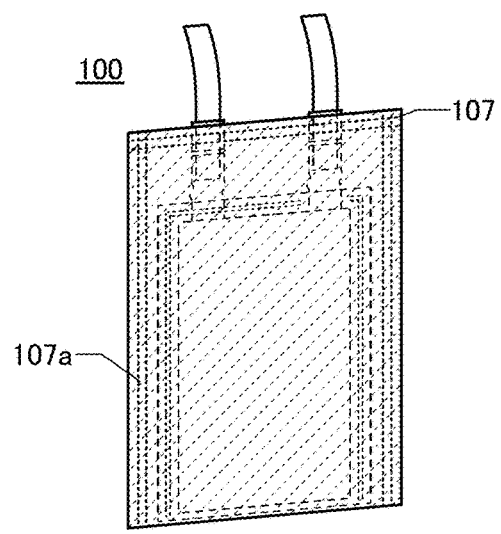

Next, the plurality of units electrically connected to each other are covered with a newly prepared exterior body 107 (see FIG. 10A). Then, thermocompression bonding is performed along one side of the exterior body 107 that overlap the sealing layer 120 provided on the positive electrode lead 121 and the sealing layer 120 provided on the negative electrode lead 125 in a manner similar to that of the first sealing (see FIG. 10B). Then, a solvent or an electrolyte may be additionally injected from the unsealed side 107b as needed. Then, the exterior body 107 is sealed under vacuum, heat, and pressure in a manner similar to that of the first sealing to obtain the secondary battery 100 (see FIG. 10C).

[7. Modification Example]

FIG. 11A shows the secondary battery 100 as a modification example of the secondary battery 100. The secondary battery 100 shown in FIG. 11A is different from the secondary battery 100 shown in FIG. 4 in the arrangement of the positive electrode lead 121 and the negative electrode lead 125. Specifically, the positive electrode lead 121 and the negative electrode lead 125 in the secondary battery 100 in FIG. 4 are provided on the same side of the exterior body 107, whereas the positive electrode lead 121 and the negative electrode lead 125 in the secondary battery 100 in FIGS. 11A and 11B are provided on different sides of the exterior body 107. The lead electrodes of the secondary battery of one embodiment of the present invention can be freely positioned as described above; therefore, the degree of freedom in design is high. Accordingly, a product including the secondary battery of one embodiment of the present invention can have a high degree of freedom in design. Furthermore, a yield of products each including the secondary battery of one embodiment of the present invention can be increased.

FIG. 11B illustrates a fabrication process of the secondary battery 100 in FIG. 11A. The manufacturing method of the secondary battery 100 in FIG. 4 can be referred to for the details. Note that in FIG. 11B, the gel electrolyte 104 is omitted.

Pressing (e.g., embossing) may be performed to form unevenness in advance on a surface of a film used as the exterior body 107. The unevenness on the surface of the film increases flexibility of a secondary battery and further relieves stress. The depressions or projections of a surface (or a rear surface) of the film formed by embossing form an obstructed space that is sealed by the film serving as a part of a wall of the sealing structure and whose inner volume is variable. It can be said that the depressions or projections of the film form an accordion structure (bellows structure) in this obstructed space. Note that embossing, which is a kind of pressing, is not necessarily employed and any method that allows formation of a relief on part of the film is employed.

This embodiment can be implemented in appropriate combination with any of the other embodiments and example.

Embodiment 4

In this embodiment, an electronic device in which the secondary battery 100 of one embodiment of the present invention can be provided is described with reference to FIGS. 12A and 12B.

The secondary battery 100 of one embodiment of the present invention is suitable for a wearable device because the secondary battery 100 is flexible.

Figure 12A:
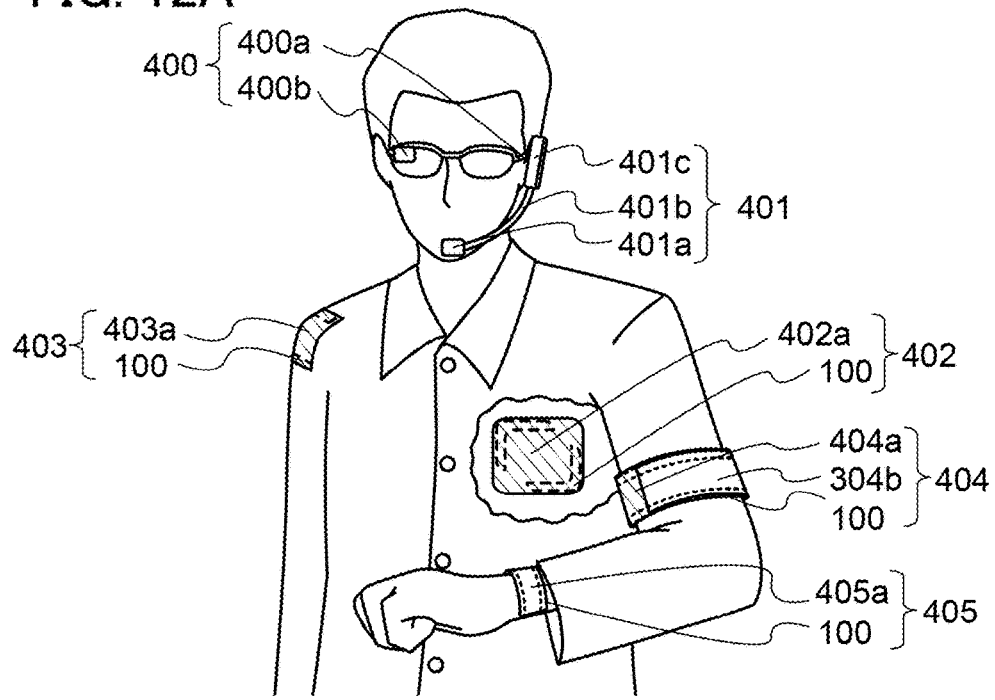
FIGS. 12A and 12B each illustrate an example of an electronic device.
Figure 12B:
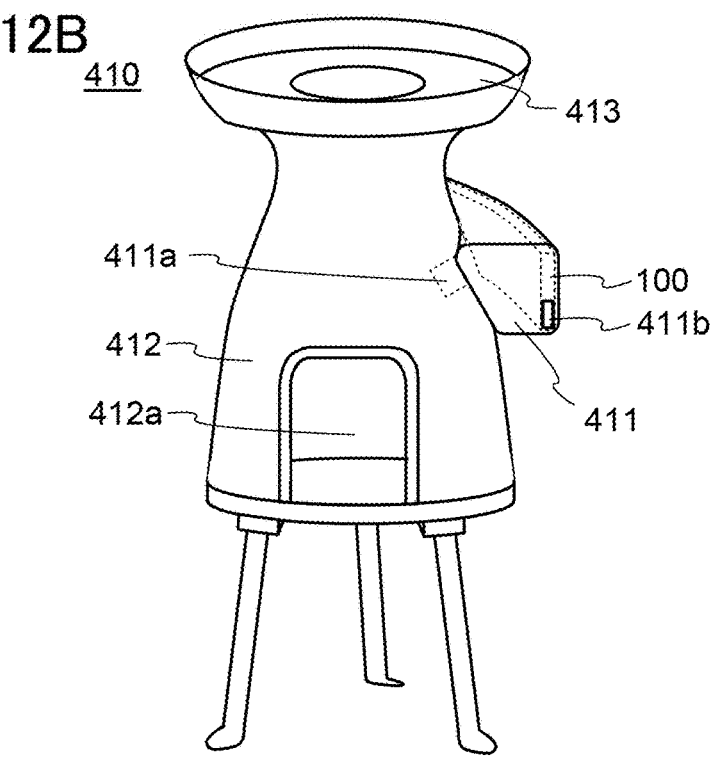

For example, the secondary battery 100 can be provided in a glasses-type device 400 illustrated in FIG. 12A. The glasses-type device 400 includes a frame 400a and a display part 400b. The secondary battery 100 is provided in a temple of the frame 400a having a curved shape, whereby the glasses-type device 400 can have a well-balanced weight and can be used continuously for a long time.

The secondary battery 100 can be provided in a headset-type device 401. The headset-type device 401 includes at least a microphone part 401a, a flexible pipe 401b, and an earphone part 401c. The plurality of secondary batteries 100 can be provided in the flexible pipe 401b and the earphone part 401c.

Furthermore, the secondary battery 100 can be provided in a device 402 that can be attached directly to a body. The plurality of secondary batteries 100 are provided in a thin housing 402a of the device 402.

Furthermore, the secondary battery 100 can be provided in a device 403 that can be attached to clothes. The plurality of the secondary batteries 100 are provided in a thin housing 403a of the device 403.

Furthermore, the secondary battery 100 can be provided in an armband device 404. In the armband device 404, a display part 304b is provided over a main body 404a and the plurality of secondary batteries 100 can be provided in the main body 404a.

Furthermore, the secondary battery 100 can be provided in a watch-type device 405. The watch-type device 405 includes a display part 405a, and the plurality of secondary batteries 100 can be provided in the watch-type device 405.

Since the secondary battery 100 of one embodiment of the present invention is bendable, it can be provided with high space efficiency in any of a variety of electronic devices. For example, in a stove 410 illustrated in FIG. 12B, a module 411 is attached to a main body 412. The module 411 includes the secondary battery 100, a motor, a fan, an air outlet 411a, and a thermoelectric generation device. In the stove 410, after a fuel is injected through an opening 412a and ignited, outside air can be sent through the air outlet 411a to the inside of the stove 410 by rotating the motor and the fan which are included in the module 411 using power of the secondary battery 100. In this manner, the stove 410 can have strong heating power because outside air can be taken into the inside of the stove 410 efficiently. In addition, cooking can be performed on an upper grill 413 with thermal energy generated by the combustion of fuel. The thermal energy is converted into power with the thermoelectric generation device of the module 411, and the secondary battery 100 is charged with the power. The power charged into the secondary battery 100 can be output through an external terminal 411b.

Embodiment 5

Furthermore, an example of a moving object which is an example of the electronic devices will be described with reference to FIGS. 13A and 13B.

The secondary battery described in the above embodiment can be used as a control battery. The control battery can be externally charged by electric power supply using a plug-in technique or contactless power feeding. Note that in the case where the moving object is an electric railway vehicle, the electric railway vehicle can be charged by electric power supply from an overhead cable or a conductor rail.

Figure 13A:
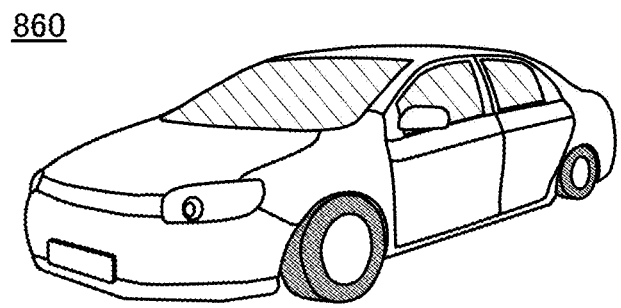
FIGS. 13A and 13B illustrate an example of an electronic device.
Figure 13B:
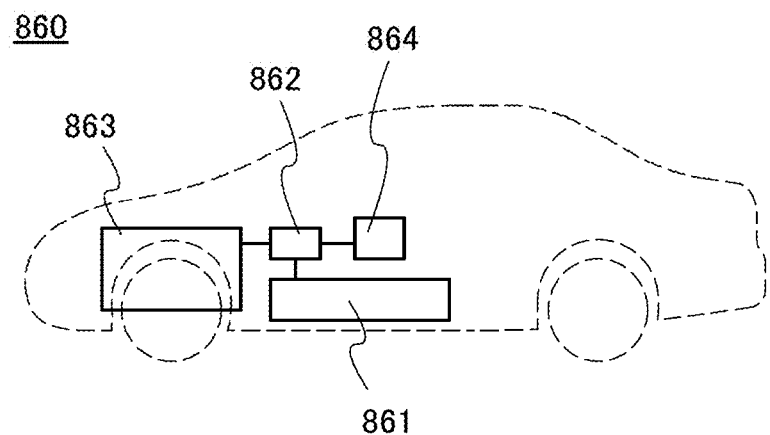
Figure 14:
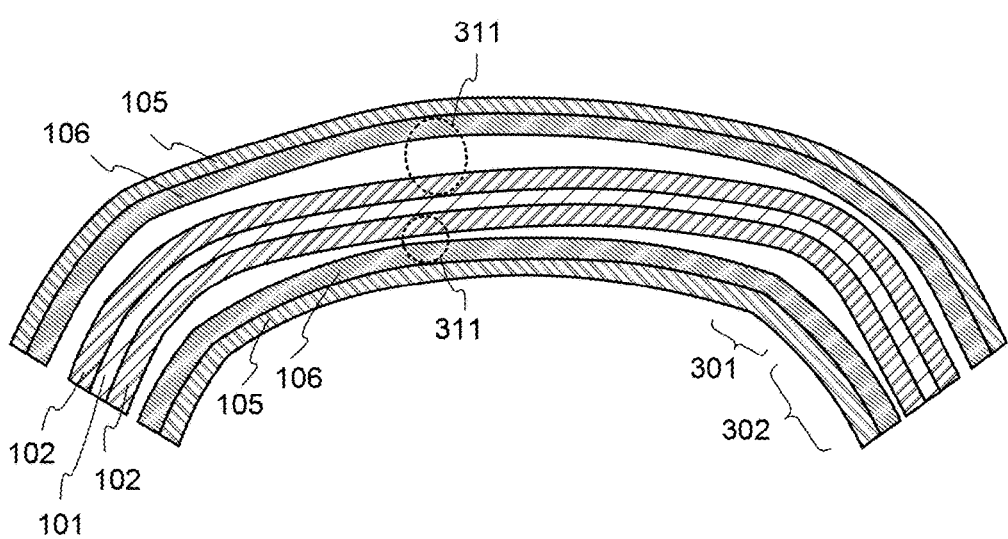
FIG. 14 illustrates a distance between a positive electrode current collector and a negative electrode current collector.

FIGS. 13A and 13B illustrate an example of an electric vehicle. An electric vehicle 860 is equipped with a battery 861. The output of the electric power of the battery 861 is adjusted by a control circuit 862 and the electric power is supplied to a driving device 863. The control circuit 862 is controlled by a processing unit 864 including a ROM, a RAM, a CPU, or the like which is not illustrated.

The driving device 863 includes a DC motor or an AC motor either alone or in combination with an internal-combustion engine. The processing unit 864 outputs a control signal to the control circuit 862 based on input data such as data on operation (e.g., acceleration, deceleration, or stop) of a driver or data during driving (e.g., data on an upgrade or a downgrade, or data on a load on a driving wheel) of the electric vehicle 860. The control circuit 862 adjusts the electric energy supplied from the battery 861 in accordance with the control signal of the processing unit 864 to control the output of the driving device 863. In the case where the AC motor is mounted, although not illustrated, an inverter which converts direct current into alternate current is also incorporated.

The battery 861 can be charged by external electric power supply using a plug-in technique. For example, the battery 861 is charged through a power plug from a commercial power supply. The battery 861 can be charged by converting the supplied power into DC constant voltage having a predetermined voltage level through a converter such as an AC-DC converter. The use of the secondary battery including the secondary battery electrode of one embodiment of the present invention as the battery 861 can be conducive to an increase in battery capacity, leading to an improvement in convenience. When the battery 861 itself can be more compact and more lightweight as a result of improved characteristics of the battery 861, the vehicle can be lightweight, leading to an increase in fuel efficiency.

Note that it is needless to say that one embodiment of the present invention is not limited to the electronic device described above as long as the secondary battery of one embodiment of the present invention is included.

This embodiment can be implemented in combination with any of the other embodiments as appropriate.

Example 1

This example shows measurement results of a static friction coefficient of the other surface of a negative electrode current collector on which a negative electrode active material layer is not provided and a static friction coefficient of one surface of the negative electrode current collector on which the negative electrode active material layer is provided are shown.

<Static Friction Coefficient of the Other Surface of Negative Electrode Current Collector on which Negative Electrode Active Material Layer is not Provided>

A static friction coefficient between the other surfaces of negative electrode current collectors on which negative electrode active material layers are not provided were obtained as follows.

Figure 15A:
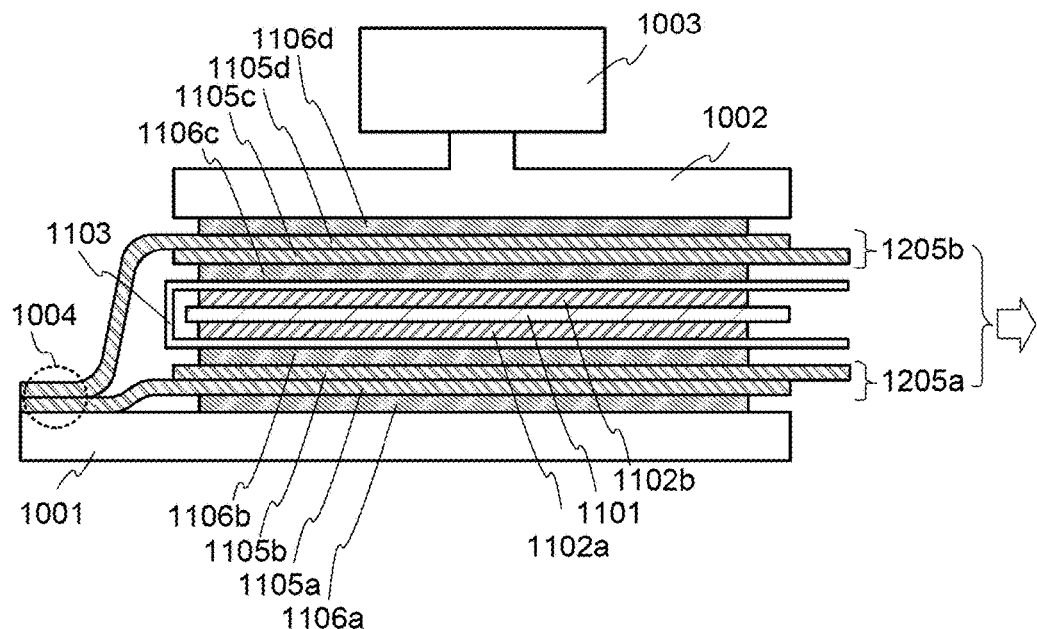
FIGS. 15A and 15B each illustrate a measurement method of static friction.

As illustrated in FIG. 15A, a positive electrode current collector, a negative electrode current collector, and a separator that were dried were put over a flat horizontal glass substrate 1001. Specifically, a negative electrode current collector 1105a having a negative electrode active material layer 1106a on one surface and no negative electrode active material layer on the other surface, a negative electrode current collector 1105b having a negative electrode active material layer 1106b on one surface and no negative electrode active material layer on the other surface, a positive electrode current collector 1101 which was covered with a separator 1103 and had a positive electrode active material layer 1102a on one surface and a positive electrode active material layer 1102b on the other surface, a negative electrode current collector 1105c having a negative electrode active material layer 1106c on one surface and no negative electrode active material layer on the other surface, and a negative electrode current collector 1105d having a negative electrode active material layer 1106d on one surface and no negative electrode active material layer on the other surface were stacked in this order from the glass substrate side.

A flat plate 1002 and a weight 1003 were put on the positive electrode current collector, the negative electrode current collector, and the separator. A load by the flat plate 1002 and the weight 1003 was 42.2 g/cm².

Here, the other surface of the negative electrode current collector 1105a on which a negative electrode active material was not provided and the other surface of the negative electrode current collector 1105b on which a negative electrode active material was not provided were arranged to be in contact with each other on a contact surface 1205a. Similarly, the other surface of the negative electrode current collector 1105c on which a negative electrode active material was not provided and the other surface of the negative electrode current collector 1105d on which a negative electrode active material was not provided were arranged to be in contact with each other on a contact surface 1205b.

Then, an end portion 1004 of the negative electrode current collectors positioned on the outermost sides (i.e., the negative electrode current collector 1105a and the negative electrode current collector 1105d) was fixed to the substrate 1001 with an adhesive tape.

Then, a load testing machine (a handy load display gauge manufactured by Aikoh Engineering Co., Ltd) was connected to the positive electrode current collector 1101 which were not fixed in the above step. The load testing machine was pulled in a horizontal direction at about 1 mm per second.

A slide occurred on the contact surface 1205a and the contact surface 1205b by pulling the load testing machine. The maximum value of friction in a period until the positive electrode current collector 1101 moved 1 cm was measured, and the measurement value was the maximum static friction force between the other surfaces on which negative electrode active materials were not provided.

As results of performing the above measurement three times, the maximum static friction forces between the other surfaces on which negative electrode active materials were not provided were 4.08 N, 4.14 N, and 4.23 N.

The static friction coefficients between the other surfaces on which negative electrode active materials were not provided calculated from the maximum static friction forces and the load caused by the flat plate 1002 and the weight 1003 were 0.57, 0.58, and 0.59.

<Static Friction Coefficient Between Negative Electrode Active Material Layer and Separator>

A static friction coefficient of one surface of a negative electrode current collector on which a negative electrode active material layer was provided, more specifically, static friction coefficient between one surface of a negative electrode current collector on which a negative electrode active material layer was provided and the separator was obtained as follows.

Figure 15B:
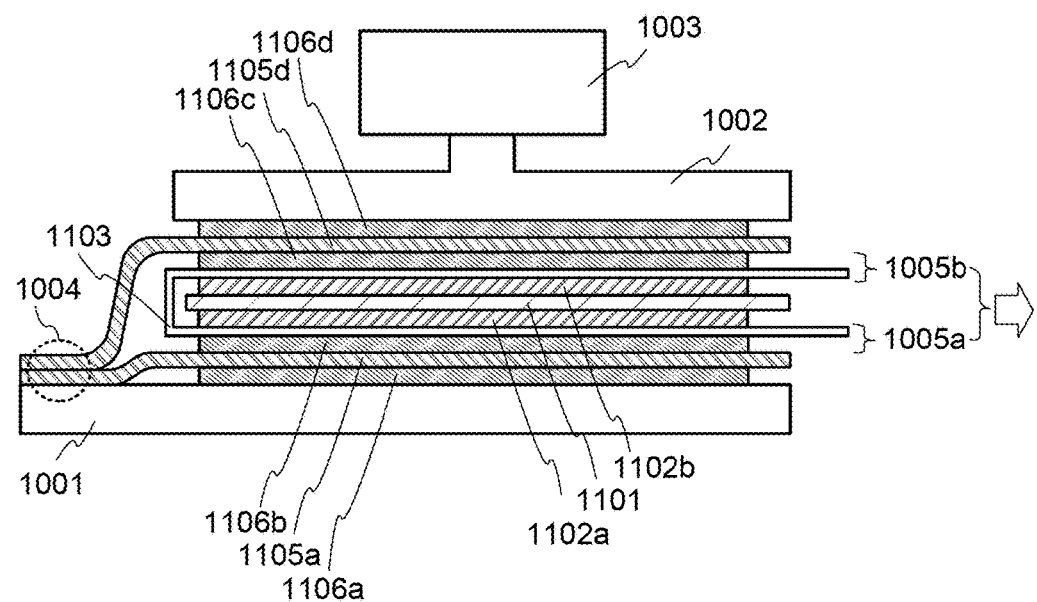

As illustrated in FIG. 15B, a positive electrode current collector, a negative electrode current collector, and a separator that were dried were put over a flat horizontal glass substrate 1001. Specifically, the negative electrode current collector 1105a having the negative electrode active material layer 1106a on one surface and the negative electrode active material layer 1106b on the other surface, the positive electrode current collector 1101 which was covered with the separator 1103 and had the positive electrode active material layer 1102a on one surface and the positive electrode active material layer 1102b on the other surface, and the negative electrode current collector 1105d having the negative electrode active material layer 1106c on one surface and the negative electrode active material layer 1106d on the other surface were stacked in this order from the glass substrate side.

The flat plate 1002 and the weight 1003 were put on the positive electrode current collector, the negative electrode current collector, and the separator. A load by the flat plate 1002 and the weight 1003 was 42.2 g/cm$^2$.

Here, the negative electrode active material layer 1106b formed over the negative electrode current collector 1105a and the separator 1103 were arranged to be in contact with each other on the contact surface 1005a. Similarly, the negative electrode active material layer 1106c formed over the negative electrode current collector 1105d and the separator 1103 were arranged to be in contact with each other on a contact surface 1005b.

Then, the end portion 1004 of the negative electrode current collectors (i.e., the negative electrode current collector 1105a and the negative electrode current collector 1105d) was fixed to the substrate 1001 with an adhesive tape.

Then, a load testing machine (a handy load display gauge manufactured by Aikoh Engineering Co., Ltd) was connected to the positive electrode current collector 1101 which were not fixed in the above step. The load testing machine was pulled in a horizontal direction at about 1 mm per second.

A slide occurred on the contact surface 1005a and the contact surface 1005b by pulling the load testing machine. The maximum value of friction in a period until the positive electrode current collector 1101 moved 1 cm was measured, and the measurement value was the maximum static friction force between the other surfaces on which negative electrode active materials were not provided.

As results of performing the above measurement three times, the maximum static friction forces between the negative electrode active material layer and the separator were 6.23 N, 6.15 N, and 6.17 N.

The static friction coefficients between the negative electrode active material layer and the separator, which were obtained from the maximum static friction forces and the load by the flat plate 1002 and the weight 1003, were 0.88, 0.86, and 0.85.

Figure 16:
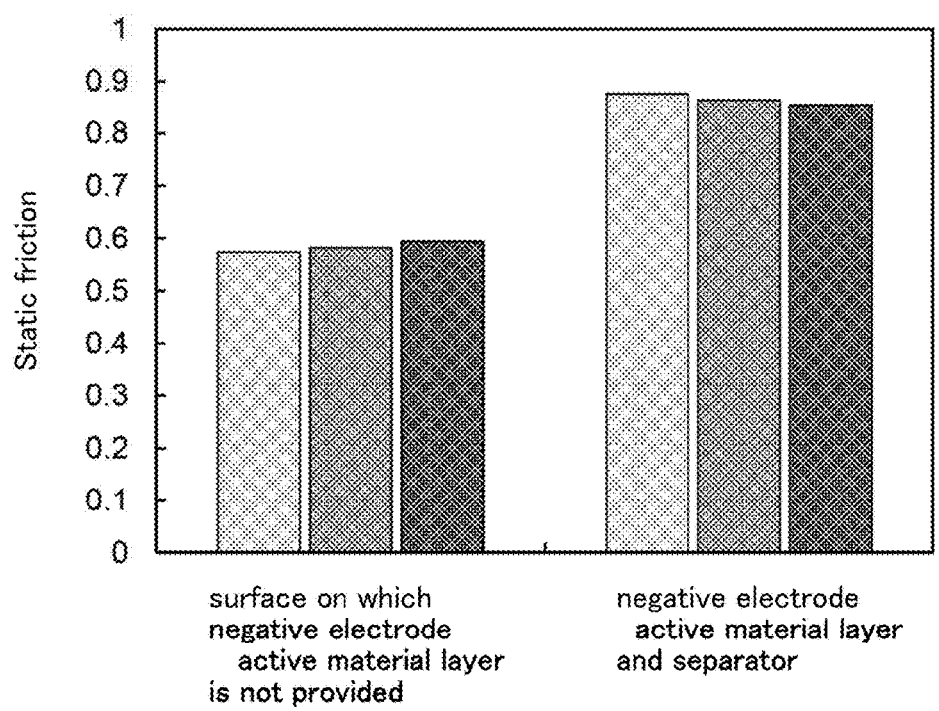
FIG. 16 shows measurement results of static friction.

FIG. 16 shows static friction coefficients between the other surfaces on which negative electrode active material layers were not provided and those between the negative electrode active material layer and the separator.

The friction coefficient between the other surfaces on which negative electrode active material layers are not provided is approximately 0.67 times the friction coefficient between surfaces on which negative electrode active material layers are provided, that is, a contact surface between the surfaces on which negative electrode active material layers are not provided has lower friction. Therefore, since the contact surface between the other surfaces on which negative electrode active material layers are not provided is formed, stress caused by the difference between the inner diameter and outer diameter of a curved portion, which is generated when the secondary battery is curved, can be reduced.

Example 2

In this example, the secondary battery of one embodiment of the present invention was fabricated, and the inside of the secondary battery was observed with X-ray computed tomography (X-ray CT). In addition, charge and discharge characteristics of the secondary battery were evaluated.

<Fabrication of Secondary Battery>

First, a material and a fabrication method of the secondary battery used as a sample in this example are described.

First, a positive electrode is described. LiCoO$_2$ was used as a positive electrode active material, and acetylene black (AB) and polyvinylidene fluoride (PVDF) as a conductive additive and a binder were mixed thereto. The proportion of the mixture of $LiCoO_2$, AB, and PVDF was as follows: $LiCoO_2$ at 90 weight %, AB at 5 weight %, and PVDF at 5 weight %. As a positive electrode current collector, aluminum with a thickness of 20 μm was used. One surface of the positive electrode current collector was coated with the mixture of $LiCoO_2$, AB, and PVDF. Thus, the positive electrode active material layer was formed.

Next, a negative electrode is described. Graphite was used as a negative electrode active material, and a gas-phase method carbon fiber (VGCF (registered trademark)), carboxymethyl cellulose (CMC), and styrene-butadiene rubber (SBR) as a conductive additive and a binder were mixed thereto. The proportion of the mixture of graphite, VGCF (registered trademark), CMC, and SBR was as follows: graphite at 96 weight %, VGCF (registered trademark) at 1 weight %, CMC at 1 weight %, and SBR at 2 weight %. Copper with a thickness of 18 μm was used as a negative electrode current collector. One surface of the negative electrode current collector was coated with the mixture of graphite, VGCF (registered trademark), CMC, and SBR to form the negative electrode active material layer.

In this example, as positive electrodes, six electrodes in each of which one surface was coated with a positive electrode active material layer were used. As negative electrodes, six electrodes in each of which one surface was coated with a negative electrode active material layer were used. That is, as the positive electrodes and the negative electrodes, twelve metal foils were used in total in six units.

Next, as a polymer included in a gel electrolyte, a poly (diethylaminoethyl methacrylate) which is a polymethacrylate-based polymer was used. More specifically, a mixture of 50 g/L poly(dimethylaminoethyl methacrylate) (PD-MAEMA) used as a framework and 50 g/L N,N,N',N'-tetra (trifluoromethanesulfonyl)dodecane-1,6-diamine ($C_{12}$TFSA) used as a cross-linking agent was used. Although reaction of the above combination of the framework and the cross-linking agent proceeds without performing heat treatment or the like to gel the combination, the rate of reaction is so slow that there is little fear that the combination is gelled in manufacturing a unit. However, it is preferable that the combination be heated because the reaction proceeds more easily, in which case the fabrication process is simplified.

As an electrolyte solution included in the gel electrolyte, a solution in which 1 mol/L of $LiPF_6$ was dissolved in an organic solvent where EC and DEC were mixed at a weight ratio of 1:1 was used.

As a separator, polypropylene was used.

As an exterior body, an aluminum laminate film was used.

The unit was manufactured using the above material. Specifically, according to the manufacturing method of Embodiment 3, one positive electrode current collector which was covered with a separator and had the positive electrode active material layer on one surface and one negative electrode current collector having the negative electrode active material layer on one surface were covered with the exterior body, the electrolyte solution that was a material of the gel electrolyte was injected to the inside of the exterior body, and the exterior body was sealed. Note that a weak adhesive sheet was attached in advance to a surface of the negative electrode current collector on which the negative electrode active material layer was not provided in order to simplify the removal of the gel electrolyte in a later step. Then, after the polymer included in the electrolyte solution was sufficiently gelled to be the gel electrolyte, the exterior body was unsealed and the unit was taken out. Next, the weak adhesive sheet was peeled from the negative electrode current collector, whereby the gel electrolyte attached to the outer surfaces of the unit was removed.

Six units fabricated as described above were stacked. Here, the six units were arranged such that surfaces of the negative electrode current collectors on which the negative electrode active material layers were not provided faced each other.

Next, a positive electrode tab and a positive electrode lead were welded by ultrasonic welding, and a negative electrode tab and a negative electrode lead were welded by ultrasonic welding. Then, the units were covered with a newly prepared exterior body.

<CT Photograph>

Figure 17A:
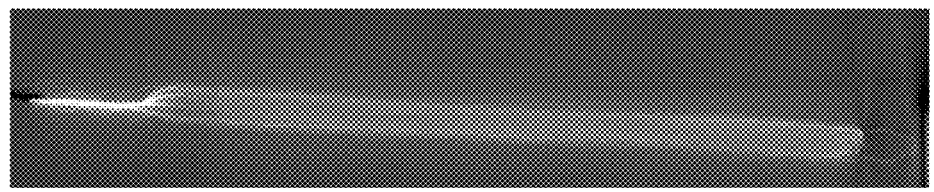
FIGS. 17A and 17B are X-ray CT photographs of a secondary battery.

As described above, the sample of a secondary battery having a capacity of approximately 300 mAh was fabricated. FIG. 17A is an X-ray CT photograph of the secondary battery.

Figure 17B:
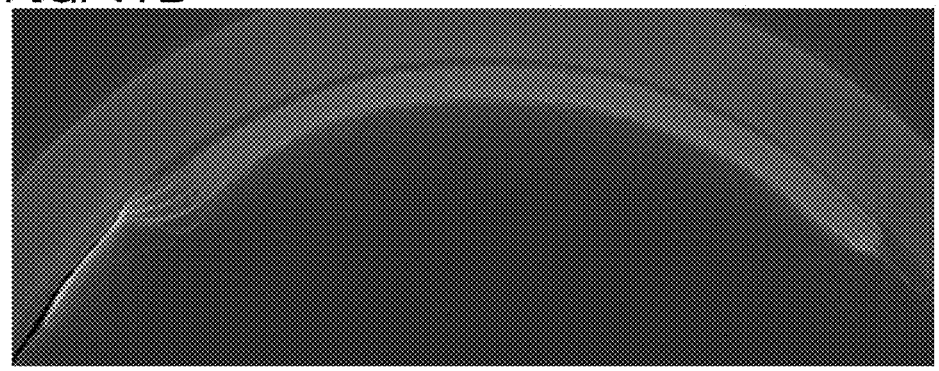

Furthermore, the sample of the secondary battery was curved and fixed to a frame having a curved surface with a curvature radius of approximately 40 mm. FIG. 17B is an X-ray CT photograph of the secondary battery in this state.

The negative electrode tab welded by ultrasonic welding is in the left sides of FIGS. 17A and 17B. Comparison of a right end portion of the current collector in FIG. 17A and that in FIG. 17B indicate that a contact surface between negative electrode current collectors slide by curving the secondary battery, so that the distance between the positive electrode and the negative electrode that are attached to each other is not changed and kept constant.

<Charge and Discharge Characteristics>

Figure 17C:
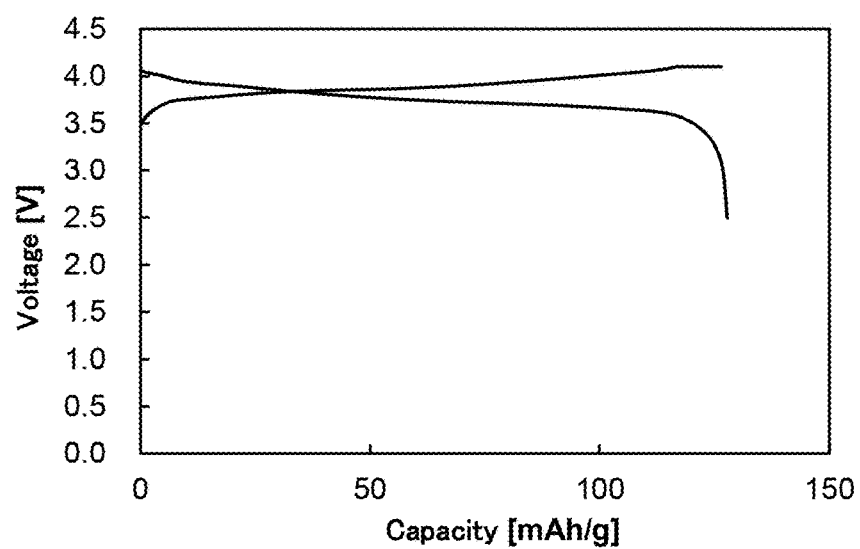
FIG. 17C is a graph showing charge and discharge characteristics of a secondary battery.

Charge and discharge characteristics of the sample of the secondary battery which was curved as shown in FIG. 17B were evaluated. Note that charge and discharge characteristics observed at the fourth cycle after three cycles of charging and discharging as an aging treatment were measured. FIG. 17C shows results thereof. The upward curve is a charge curve, and the downward curve is a discharge curve. The charging was performed under the following conditions: CCCV charging that corresponds to 0.2 C; and a termination voltage of 4.1 V. The discharging was performed under the following conditions: CC discharging that corresponds to 0.2 C; and a termination voltage of 2.5 V.

FIG. 17C shows that the sample of the secondary battery in this example can be normally charged and discharged.

EXPLANATION OF REFERENCE

100: secondary battery, 101: positive electrode current collector, 102: positive electrode active material layer, 103: separator, 103a: bonding portion, 104: gel electrolyte, 104a: electrolyte solution, 105: negative electrode current collector, 106: negative electrode active material layer, 107: exterior body, 107a: bonding portion, 107b: side, 111: positive electrode, 115: negative electrode, 120: sealing layer, 121: positive electrode lead, 122: connection region, 123: bent portion, 125: negative electrode lead, 201: contact surface, 203: contact surface, 205: contact surface, 301: portion, 302: portion, 304b: display part, 311: distance, 400: glasses-type device, 400a: frame, 400b: display part, 401: headset-type device, 401a: microphone part, 401b: flexible pipe, 401c: earphone part, 402: device, 402a: housing, 403: device, 403a: housing, 404: armband device, 404a: main body, 405: watch-type device, 405a: display part, 410: stove, 411: module, 411a: air outlet, 411b: external terminal, 412: main body, 412a: opening, 413: grill, 860: electric vehicle, 861: battery, 862: control circuit, 863: driving device, 864: processing unit, 1001: substrate, 1002: plate, 1004: end portion, 1005a: contact surface, 1005b: contact surface, 1101: positive electrode current collector, 1102a: positive electrode active material layer, 1102b: positive electrode active material layer, 1103: separator, 1105a: negative electrode current collector, 1105b: negative electrode current collector, 1105c: negative electrode current collector, 1105d: negative electrode current collector, 1106a: negative electrode active material layer, 1106b: negative electrode active material layer, 1106c: negative electrode active material layer, 1106d: negative electrode active material layer, 1205a: contact surface, and 1205b: contact surface.

This application is based on Japanese Patent Application serial no. 2014-190900 filed with Japan Patent Office on Sep. 19, 2014, the entire contents of which are hereby incorporated by reference.

The invention claimed is:

1. A secondary battery comprising:
a first positive electrode current collector;
a first positive electrode active material layer over and in contact with a top surface of the first positive electrode current collector;
a first negative electrode active material over the first positive electrode active material layer;
a first negative electrode current collector over and in contact with a top surface of the first negative electrode active material layer;
a second negative electrode current collector over and in contact with a whole top surface of the first negative electrode current collector;
a second positive electrode active material layer over the second negative electrode active material layer;
a second positive electrode current collector over and in contact with a top surface of the second positive electrode active material layer; and
a gel electrolyte and a separator that are between the first positive electrode current collector and the first negative electrode current collector,
wherein the gel electrolyte includes a polymer, an electrolyte, and a solvent,
wherein in the first positive electrode current collector, the first negative electrode current collector, the second positive electrode current collector, the second negative electrode current collector, the gel electrolyte, and the separator are covered with an exterior body, and
wherein the first positive electrode current collector, the first negative electrode current collector, the second positive electrode current collector, the second negative electrode current collector, the separator, and the exterior body are flexible.

2. The secondary battery according to claim 1, wherein a static friction coefficient between the first negative electrode current collector and the second negative electrode current collector is less than or equal to 0.80.

3. The secondary battery according to claim 1, wherein the polymer is poly(dimethylaminoethyl methacrylate).

4. The secondary battery according to claim 2, wherein the static friction coefficient is greater than or equal to 0.01 and less than or equal to 0.80.

5. The secondary battery according to claim 2, wherein the static friction coefficient is greater than or equal to 0.20 and less than or equal to 0.65.

6. The secondary battery according to claim 2, wherein the static friction coefficient is greater than or equal to 0.57 and less than or equal to 0.59.

7. A battery comprising:
a first positive electrode current collector;
a first positive electrode active material layer over and in contact with a top surface of the first positive electrode current collector;
a first negative electrode active material over the first positive electrode active material layer;
a first negative electrode current collector over and in contact with a top surface of the first negative electrode active material layer;
a second negative electrode current collector over and in contact with a whole top surface of the first negative electrode current collector;
a gel electrolyte and a separator that are between the first positive electrode current collector and the first negative electrode current collector,
wherein the second negative electrode current collector is able to slide on the top surface of the first negative electrode current collector.

8. The battery according to claim 7,
wherein a static friction coefficient between the first negative electrode current collector and the second negative electrode current collector is less than or equal to 0.80.

9. The battery according to claim 7,
wherein the gel electrolyte includes poly(dimethylaminoethyl methacrylate).

10. The battery according to claim 8,
wherein the static friction coefficient is greater than or equal to 0.01 and less than or equal to 0.80.

11. The battery according to claim 8,
wherein the static friction coefficient is greater than or equal to 0.20 and less than or equal to 0.65.

12. The battery according to claim 8,
wherein the static friction coefficient is greater than or equal to 0.57 and less than or equal to 0.59.

13. The battery according to claim 7,
wherein the battery is a secondary battery.

14. A battery comprising:
a first negative electrode current collector;
a first negative electrode active material layer over and in contact with a top surface of the first negative electrode current collector;
a first positive electrode active material over the first negative electrode active material layer;
a first positive electrode current collector over and in contact with a top surface of the first positive electrode active material layer;
a second positive electrode current collector over and in contact with a whole top surface of the first positive electrode current collector;
a gel electrolyte and a separator that are between the first negative electrode current collector and the first positive electrode current collector,
wherein the second positive electrode current collector is able to slide on the top surface of the first positive electrode current collector.

15. The battery according to claim 14,
wherein a static friction coefficient between the first positive electrode current collector and the second positive electrode current collector is less than or equal to 0.80.

16. The battery according to claim 14,
wherein the gel electrolyte includes poly(dimethylaminoethyl methacrylate).

17. The battery according to claim 15,
wherein the static friction coefficient is greater than or equal to 0.01 and less than or equal to 0.80.

18. The battery according to claim 15,
wherein the static friction coefficient is greater than or equal to 0.20 and less than or equal to 0.65.

19. The battery according to claim 15,
wherein the static friction coefficient is greater than or equal to 0.57 and less than or equal to 0.59.

20. The battery according to claim 14,
wherein the battery is a secondary battery.

* * * * *

UNITED STATES PATENT AND TRADEMARK OFFICE
CERTIFICATE OF CORRECTION

PATENT NO. : 9,843,073 B2
APPLICATION NO. : 14/854349
DATED : December 12, 2017
INVENTOR(S) : Yumiko Yoneda et al.

It is certified that error appears in the above-identified patent and that said Letters Patent is hereby corrected as shown below:

In the Claims

Column 25, Line 23, in Claim 1, after "material" insert --layer--;

Column 25, Line 30, in Claim 1, after "collector;" insert --a second negative electrode active material layer over and in contact with a top surface of the second negative electrode current collector;--;

Column 25, Line 41, in Claim 1, remove "in" after --wherein--;

Column 26, Line 6, in Claim 7, after "material" insert --layer--; and

Column 26, Line 46, in Claim 14, after "material" insert --layer--.

Signed and Sealed this
Twenty-fourth Day of April, 2018

Andrei Iancu
*Director of the United States Patent and Trademark Office*